United States Patent
Mori et al.

(10) Patent No.: US 8,463,981 B2
(45) Date of Patent: Jun. 11, 2013

(54) STORAGE APPARATUS HAVING DEDUPLICATION UNIT

(75) Inventors: Hajime Mori, Yokohama (JP); Norihiko Kawakami, Sagamihara (JP); Hiroshi Hirayama, Yokohama (JP); Katsumi Ouchi, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 221 days.

(21) Appl. No.: 13/000,317

(22) PCT Filed: Dec. 8, 2010

(86) PCT No.: PCT/JP2010/007135
§ 371 (c)(1),
(2), (4) Date: Dec. 20, 2010

(87) PCT Pub. No.: WO2012/077162
PCT Pub. Date: Jun. 14, 2012

(65) Prior Publication Data
US 2012/0151169 A1 Jun. 14, 2012

(51) Int. Cl.
*G06F 12/02* (2006.01)
(52) U.S. Cl.
USPC ......... 711/6; 711/166; 711/162; 711/E12.002

(58) Field of Classification Search
USPC .............................. 711/166, E12.002, 6, 162
See application file for complete search history.

(56) References Cited

U.S. PATENT DOCUMENTS

| | | | |
|---|---|---|---|
| 6,928,526 B1 | 8/2005 | Zhu et al. | |
| 7,567,188 B1 | 7/2009 | Anglin et al. | |
| 7,822,939 B1 | 10/2010 | Veprinsky et al. | |
| 2009/0043982 A1 | 2/2009 | Kano et al. | |
| 2009/0234795 A1 | 9/2009 | Haas et al. | |

FOREIGN PATENT DOCUMENTS

JP 2003-015915 1/2003

OTHER PUBLICATIONS

PCT International Search Report on application No. PCT/JP2010/007135 dated Jul. 19, 2011; 4 pages.

*Primary Examiner* — Mardochee Chery
(74) *Attorney, Agent, or Firm* — Foley & Lardner LLP

(57) ABSTRACT

It is an object of the present invention to provide a storage apparatus that can suppress access performance degradation owing to processing of data deduplication. The storage apparatus according to the present invention acquires a sum of the access frequencies to each of redundantly allocated pieces of data, and performs the deduplication on the pieces of data having the sum of access frequencies less than a prescribed threshold.

13 Claims, 15 Drawing Sheets

| Real page ID (12151) | Physical address (12152) | Access frequency information (12153) | Hash value (12154) |
|---|---|---|---|
| 001 | RG01:HDD01:XXXX1 | 200 | A |
| 002 | RG01:HDD02:XXXX2 | 100 | B |
| 003 | RG02:HDD03:XXXX3 | 50 | C |
| 004 | RG02:HDD03:XXXX4 | 500 | C |
| 005 | RG02:HDD03:XXXX5 | 200 | C |
| ... | ... | ... | ... |

| Pool ID (12161) | Deduplication threshold (12162) |
|---|---|
| 001 | 400 |
| ... | ... |

| Real page ID | Hash value | Virtual page ID | Access frequency information for each virtual page |
|---|---|---|---|
| 001 | A | 1 | 150 |
| | | 3 | 30 |
| | | 6 | 20 |

| Real page ID (12181) | Physical address (12182) | Access frequency information (12183) |
|---|---|---|
| 001 | RG01:HDD01:XXXX1 | 200 |
| 002 | RG01:HDD02:XXXX2 | 100 |
| 003 | RG02:HDD03:XXXX3 | 50 |
| 004 | RG02:HDD03:XXXX4 | 500 |
| 005 | RG02:HDD03:XXXX5 | 200 |
| ... | ... | ... |

FIG. 14

| Real page ID (12191) | Virtual page ID (12192) | Hash value (12193) |
|---|---|---|
| 003 | 4 | C |
| 004 | 5 | C |
| 001 | 1 | A |
| 005 | 3 | A |
| ... | ... | ... |

FIG. 18

| Pool ID | RG_ID | HDD_ID | Data deduplication targets |
|---|---|---|---|
| 001 | 01 | 001-009 | Target |
| 001 | 02 | 010-018 | Target |
| 001 | 03 | 019-027 | Not target |
| ... | ... | ... | ... |

STORAGE APPARATUS HAVING DEDUPLICATION UNIT

TECHNICAL FIELD

The present invention relates to a storage apparatus.

BACKGROUND ART

A storage apparatus is controlled according to a RAID (Redundant Array of In-expensive Disks) system, and includes a plurality of hard disk devices (hereinafter, also referred to as HDD: Hard Disk Drive) disposed in an array arrangement, and a controller controlling the hard disk devices. The storage apparatus is connected to a host computer such as a server via a data link such as a SAN (Storage Area Network), and provides a logical storage area (hereinafter, also referred to as a logical volume) furnished with redundancy on the basis of a RAID configuration.

A conventional storage apparatus requires that a storage capacity to be required in the future is preliminarily determined in a designing stage and assigned to a logical volume. Accordingly, it is required to preliminarily purchase HDDs which are not used in actuality, causing tendency of increasing a cost burden of a user of the storage. PTL 1, which will be cited below, provides a technique referred to as thin provisioning to solve this problem. This technique provides a host computer with a virtual volume, which is a virtual storage area, and dynamically assigns a required amount when data writing is actually caused by the host computer.

The technique described in PTL 1 prepares a pool area, which is a storage area, in a storage apparatus, and a plurality of host computers share a plurality of virtual volumes through the pool area. On issuance of a writing request by the host computer, a storage area required for writing of data is assigned to the virtual volume. The storage apparatus employing this technique is capable of flexibly extending the capacity of the pool area by installing an additional HDD as necessary.

In an environment where the storage capacity is virtualized using the thin pro-visioning technique, the storage apparatus assigns a page from the pool area responsive to a writing request issued by the host computer. The pool area is an aggregate of storage capacities including at least one RAID group. The page is a storage capacity unit assigned by the storage apparatus from the pool area as an access target of the host computer.

In the volume virtualization environment where the storage capacity is virtualized, the storage apparatus provides the host computer with a virtualized logical volume (virtual volume), and further configures virtualized pages in the virtual volume. The virtual page is associated with any one of pages. The page may also be referred to as a real page for the sake of discriminating the page from the virtual page. In the environment where the storage capacity is virtualized, the host computer accesses the virtual page. Since the virtual page is associated with any one of the real pages, the host computer accesses the real page via the virtual page. The storage apparatus typically holds information, such as an access frequency, for each real page as a unit.

On the other hand, PTL 2, which will be cited later, describes a data deduplication technique for a storage apparatus. This technique suppresses increase in amount of data to be stored in the storage apparatus for backing up and archiving business data and the like, and does not store redundant data in the storage apparatus in order to improve data capacity efficiency. The data deduplication is a technique that does not write data that is to be finally redundant into a HDD if data to be newly stored in the HDD, so-called writing data, is identical with data already stored in the HDD. Further, alternatively, after writing data is temporarily written into the HDD, this technique asynchronously verifies whether the writing data is identical with data having already been stored or not; if the data is identical, the redundant data is deleted. In order to verify whether the writing data is identical with the data having already been stored into the HDD or not, a fast search employing hashing is typically utilized.

CITATION LIST

Patent Literature
PTL 1: JP Patent Publication (Kokai) No. 2003-15915A (2003)
PTL 2: U.S. Pat. No. 6,928,526

SUMMARY OF INVENTION

Technical Problem

In virtualization of the storage capacity, the storage apparatus may assign a real page including the identical contents to a plurality of virtual volumes, thereby sometimes allowing the host computer to access the data having the identical contents via different virtual volumes. In this case, if the data deduplication as described in PTL 2 is performed, a plurality of real pages having the identical contents is integrated into any one of the real pages. Accordingly, each virtual page is associated with the integrated real page.

That is, if the data deduplication is performed, access having been distributed among the plurality of real pages is concentrated into the single real page. This causes a possibility of reducing access performance of the storage apparatus.

The present invention is made in order to solve the above problem. It is an object of the present invention to provide a storage apparatus capable of suppressing access performance degradation owing to the data deduplication.

Solution to Problem

A storage apparatus according to the present invention acquires sums of access frequencies for respective pieces of data that have been redundantly allocated, and performs deduplication on data whose sum of access frequencies is less than a prescribed threshold.

Advantageous Effects of Invention

Since the storage apparatus according to the present invention performs the deduplication if the sum of access frequencies of redundant data is less than the prescribed threshold, the access frequency for the data after deduplication can be suppressed less than the prescribed threshold. This can avoid access to the data after deduplication from being concentrated, thereby allowing performance degradation to be suppressed.

BRIEF DESCRIPTION OF DRAWINGS

FIG. 6 is a diagram showing a configuration of a page administration table 1215 and an example stored in the main memory 1210.

FIG. 7 is a diagram showing a configuration of a deduplication threshold table 1216 and an example of data stored in the main memory 1210.

FIG. 13 is a diagram showing a configuration of a page administration table 1218 and an example of data.

FIG. 14 is a diagram showing a configuration of a deduplication target page administration table 1219 and an example of data.

FIG. 18 is a diagram showing a configuration of an apparatus configuration table 1213 and an example of data in Embodiment 5.

DESCRIPTION OF EMBODIMENTS

Embodiments of the present invention will hereinafter be described. Note that the entire embodiments are exemplary ones and the present invention is not limited by a mode of each embodiment.

The following embodiments employ HDDs as storage devices in which a storage apparatus 1000 stores data. However, recording media other than the HDDs can be employed. For example, a semiconductor memory device, a flash memory device, an optical disc drive, a magneto-optical disk drive, a magnetic tape device, a holographic memory device and the like can be employed.

In the following embodiments, a storage capacity unit on which data deduplication is performed is adopted as a virtual page unit or a pool unit. This is one example of an embodiment. Any storage capacity unit on which the data deduplication is performed may be adopted. For example, the deduplication may be performed with a storage capacity unit smaller than a virtual page and a real page, and with a storage capacity unit larger than these units. That is, in a case where the deduplication unit is performed on any data unit stored in the storage apparatus, techniques which will be described in the following embodiments may be employed.

In the following embodiments, a target on which the data deduplication is performed is specified as data stored in one pool. However, the target of the data deduplication is not limited thereto. For example, data stored in any number of pools, a RG (RAID Group) or HDD may be specified as a target of the data deduplication.

[Embodiment 1]

Figure 1:
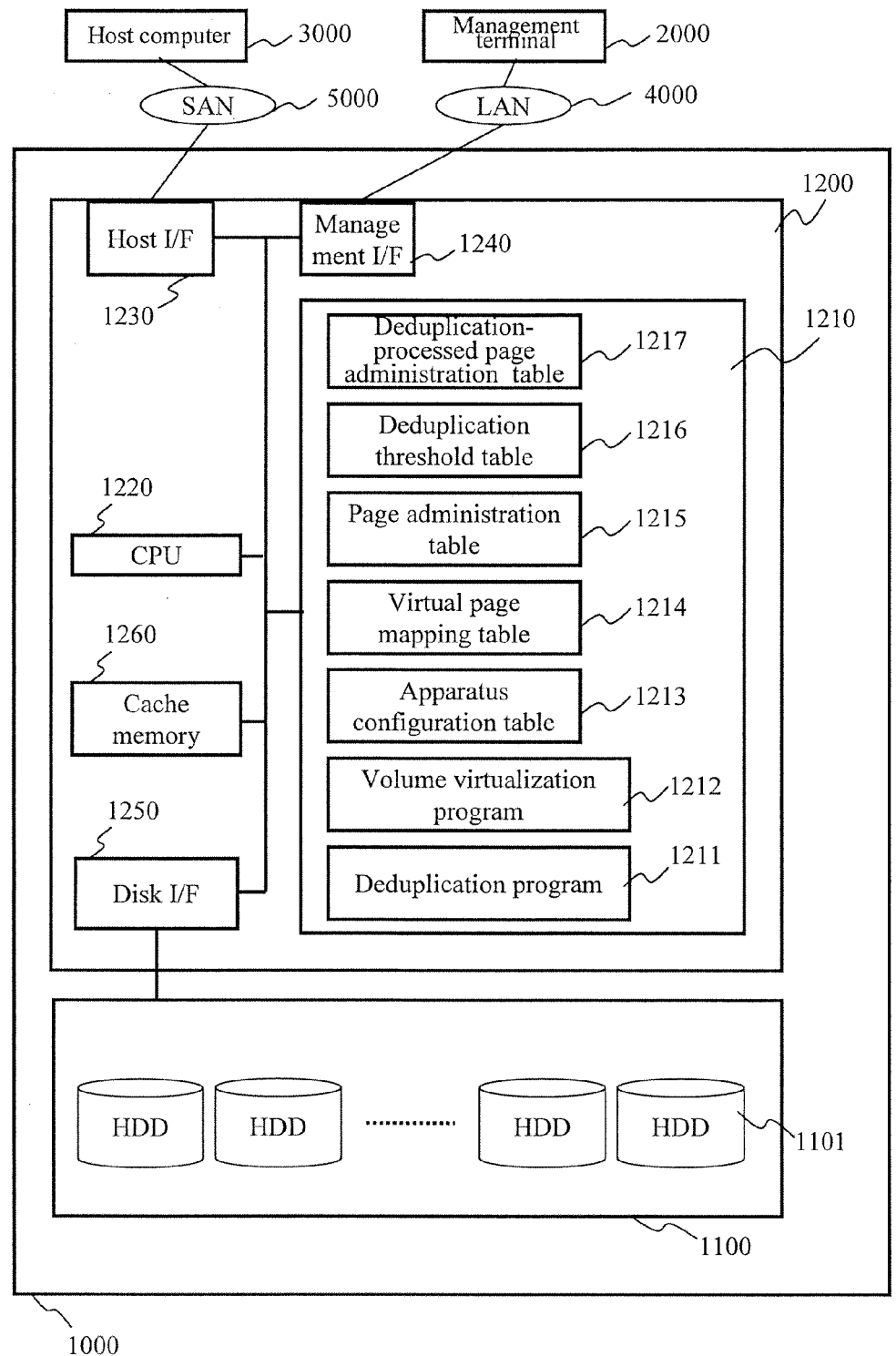
FIG. 1 is a functional block diagram of a storage apparatus 1000 according to Embodiment 1.

FIG. 1 is a functional block diagram of a storage apparatus 1000 according to Embodiment 1 of the present invention. A storage apparatus 1000 is connected to a host computer 3000 via, for example, a SAN 5000, and provides the host computer 3000 with a storage area. Further, the storage apparatus 1000 is connected to a management terminal 2000 via a LAN (Local Area Network) 4000. The management terminal 2000 is a terminal for managing a RAID configuration and the like of the storage apparatus 1000.

The host computer 3000 is a typical computer, and includes an input and output unit, a CPU (Central Processing Unit), a memory, and a data I/F for being connected with the SAN 5000. Note that these elements are omitted in FIG. 1. The host computer 3000 performs an application, such as a business program, and reads and writes the processing result to the storage apparatus 1000 via the SAN 5000.

The management terminal 2000 is connected to the storage apparatus 1000 and the host computer 3000 via the LAN 4000.

FIG. 1 shows one each of the storage apparatus 1000, management terminal 2000 and host computer 3000. The number thereof is arbitrary.

The storage apparatus 1000 includes a disk device group 1100, a disk controller (hereinafter, also referred to as a CTL) 1200. The disk device group 1100 includes at least one disk drive (HDD) 1101. The CTL 1200 controls data reading and writing from the host computer 3000 to the disk device 1101. Further, the CTL 1200 processes a management instruction from the management terminal 2000.

The CTL 1200 includes a main memory 1210, a CPU 1220, a host I/F 1230, a management I/F 1240, a disk I/F 1250 and a cache memory 1260.

The main memory 1210 stores data for managing the operation of the storage apparatus 1000, and a program to be performed by the CPU 1220. The each pieces of data stored in the main memory 1210 will be described later.

The CPU 1220 is a processing device that performs programs stored in the main memory 1210 and controls operation of the storage apparatus 1000. The CPU 1220 controls data input and output processes from and to disk devices 1101 arranged in the disk device group 1100, responsive to data input and output requests by the host computer 3000.

The host I/F 1230 is an interface that connects the storage apparatus 1000 to the host computer 3000 via the SAN 5000 and inputs and outputs data.

The management I/F 1240 is an interface that connects the storage apparatus 1000 to the management terminal 2000 via the LAN 4000 and inputs and outputs management instructions.

The disk I/F 1250 is an interface that inputs and outputs data from and to the at least one disk device 1101 included in the disk device group 1100.

The cache memory 1260 is a memory device that temporarily stores writing data to the disk device 1101 and reading data from the disk device 1101.

The cache memory 1260 and the main memory 1210 may be configured by employing volatile memories or nonvolatile memories (e.g., flash memories). In a case where each program is stored in the volatile memory, the program may additionally be stored in a nonvolatile storage apparatus.

The CPU 1220, the cache memory 1260 and the main memory 1210 may be furnished with redundancy by, for example, duplexing. The disk controller 1200 itself may be furnished with redundancy by duplexing.

The main memory 1210 stores a deduplication program 1211, a volume virtualization program 1212, an apparatus configuration table 1213, a virtual page mapping table 1214, a page administration table 1215, a deduplication threshold table 1216 and deduplication-processed page administration table 1217. Data held by these tables are created and updated by the CPU 1220. An example of a configuration where each table is created in a table format will hereinafter be described. The data format of each table is not limited thereto.

The virtual page mapping table 1214 and the page administration table 1215 in this Embodiment 1 correspond to the "administration table". The page administration table 1215 corresponds to the "access frequency administration table". The deduplication-processed page administration table 1217 corresponds to the "deduplication administration table".

The volume virtualization program 1212 is a program performing a process that virtualizes a storage capacity provided by the disk device 1101 and in turn provides the host computer 3000 with the virtualized capacity as a virtual volume 1130, which will be described later. The volume virtualization program 1212 also performs a process that configures a RAID group 1111 and a pool 1110, which will be described later, using the disk devices 1101. The deduplication program 1211 is a program that integrates real pages redundant among the plurality of virtual volumes and thereby performs deduplication.

For the sake of convenience of description, the description may be made in a manner where these programs are subjects of operations. However, it should be noted that what actually performs these programs is a processing device, such as the CPU 1220.

Figure 2:
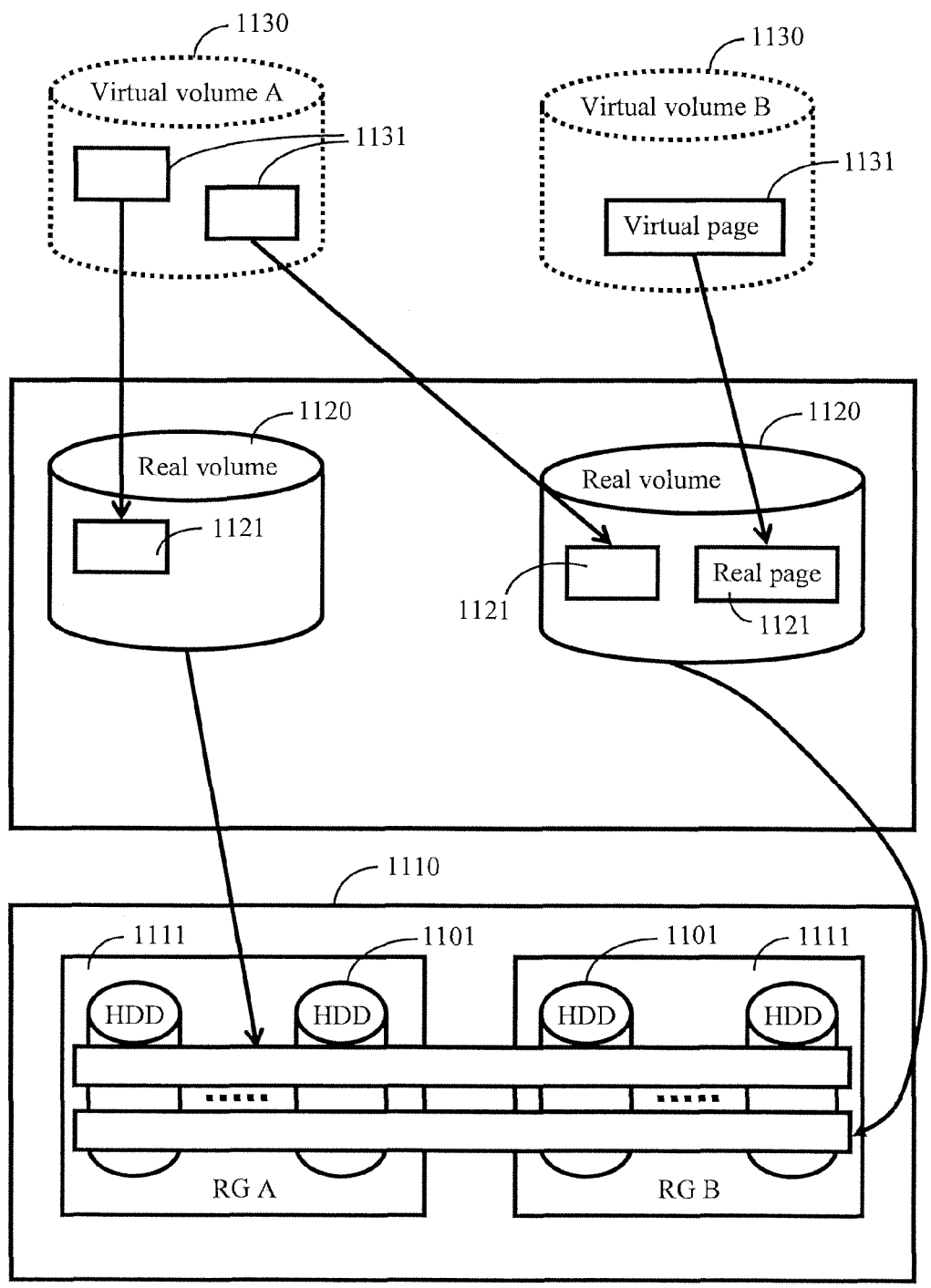
FIG. 2 is a diagram showing correspondence between a volume provided by a disk device group 1100 and a page.

FIG. 2 is a diagram showing correspondence between the volume provided by the disk device group 1100 and the page. The volume virtualization program 1212 configures the RAID group 1111 using at least one disk device 1101, and further configures the pool 1110 using at least one RAID group 1111. The pool 1110 is an aggregate of storage capacities provided by the RAID group 1111.

The volume virtualization program 1212 creates at least one real volume 1120 in the pool 1110. The real volume 1120 becomes an internal administration unit in the storage capacity provided by the storage apparatus 1000. The volume virtualization program 1212 arranges at least one real page 1121 in the real volume 1120. The real page 1121 is a storage capacity unit storing a data entity.

In an environment where the storage capacity of the storage apparatus 1000 is virtualized, the volume virtualization program 1212 virtualizes the real volume 1120 and thereby configures the virtual volume 1130 and provides this volume for the host computer 3000. The host computer 3000 is incapable of directly accessing the real volume 1120, but inputs and outputs data via the virtual volume 1130.

In a case of performing thin provisioning, the volume virtualization program 1212 sets a volume capacity in the virtual volume 1130 and provides the host computer 3000 with the set capacity. However, the virtual volume 1130 and the real volume 1120 are not initially associated with each other. More specifically, in appearance from the host computer 3000, it looks that the virtual volume 1130 includes a storage capacity. However, the virtual volume 1130 is not assigned an actual storage capacity.

When a data writing request is issued from the host computer 3000 to the void virtual volume 1130, the volume virtualization program 1212 assigns a storage capacity of the real volume 1120 as much as a size of real page 1121 necessary to write the data to the virtual volume 1130, as a virtual page 1131, to the virtual volume 1130. The real page 1121 assigned at this time and the virtual page 1131 to which this page is assigned are internally associated with each other.

In general, the volume virtualization program 1212 assigns the real page 1121 in the RAID groups 1111 in the pool 1110 in an orderly manner, and disperses the assignment of the real pages 1121 among the RAID groups 1111.

For example, when a data writing request is issued from the host computer 3000 to a virtual volume 1130A (virtual volume A in FIG. 2), the CTL 1200 first identifies the virtual page 1131 in the virtual volume 1130A, which is a target to be written, and determines whether the real page 1121 associated with the virtual page 1131 has already existed or not. If the associated real page 1121 does not exist, a new real page 1121 in the real volume 1120 is assigned to the virtual page 1131. At this time, the real pages 1121 are assigned in an orderly manner among the plurality of RAID groups 1111 configuring the pool 1110, in such a manner where the first real page 1121 is assigned from a RAID group 1111A and the second real page 1121 is assigned from a RAID group 1111B.

Figure 3:
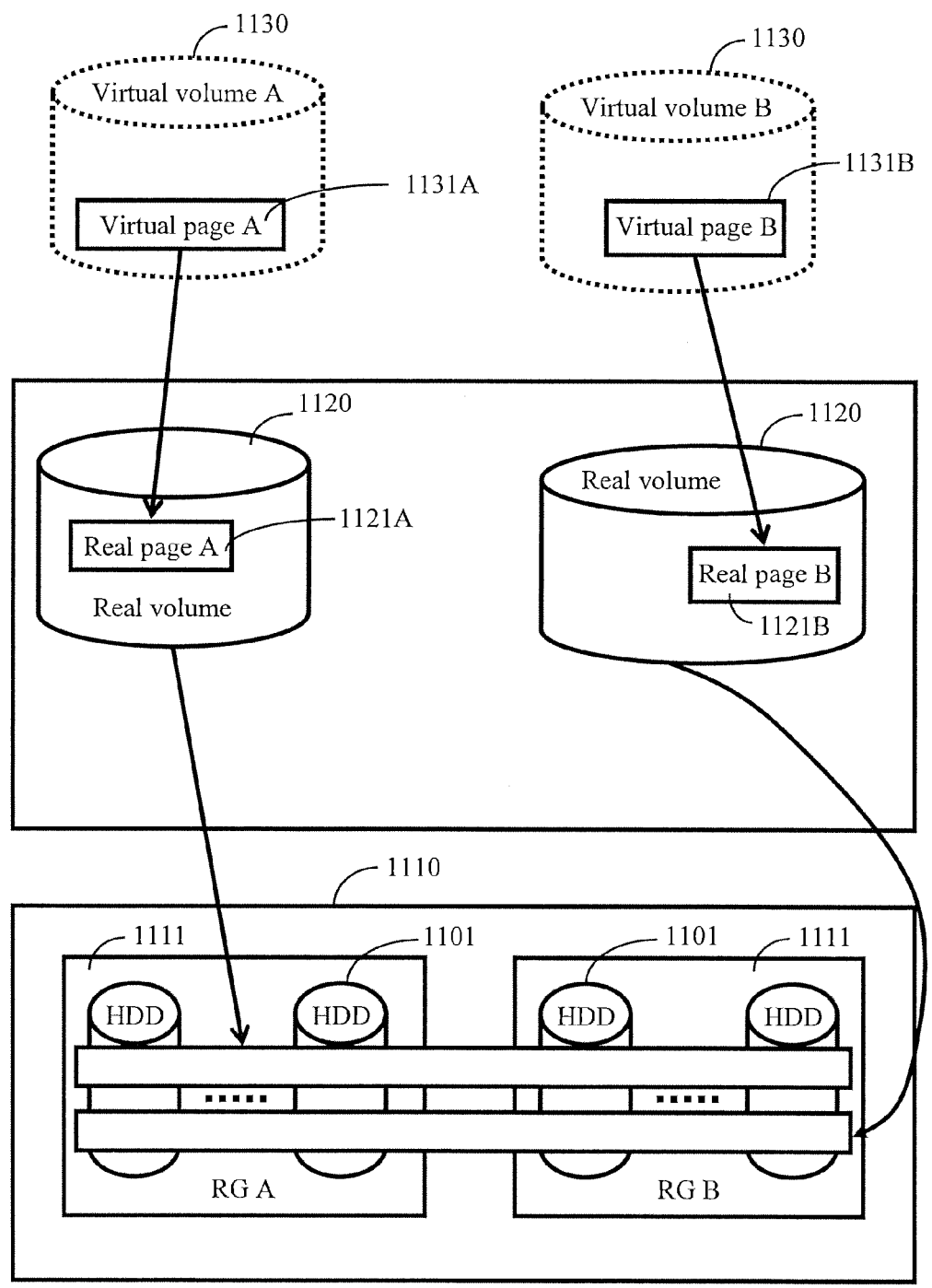
FIG. 3 is a diagram illustrating procedures of performing data deduplication in a volume allocation shown in FIG. 2.

FIG. 3 is a diagram illustrating procedures of performing data deduplication in a volume allocation shown in FIG. 2. Here, it is provided that a virtual page 1131A is assigned as a target to be accessed by the host computer 3000. It is further provided that the virtual page 1131A is assigned a real page 1121A.

It is provided that a new data writing request is issued from the host computer 3000 and the volume virtualization program 1212 newly assigns a virtual page 1131B in situations shown in FIG. 3. Further, the volume virtualization program 1212 assigns the virtual page 1131B with a real page 1121B.

If data written in the real page 1121A and data to be written in the real page 1121B are identical with each other, the data is arranged in a redundant manner and the storage capacity is superfluously consumed accordingly. Thus, the deduplication program 1211 performs the deduplication that integrates the redundant pieces of data into a single piece of data.

The deduplication program 1211 simply determines whether the data written in the real page 1121 is redundant or not using hash values and the like. When or after the CTL 1200 writes data into the real page 1121, the deduplication program 1211 calculates the hash value of the data and stores the hash data in the page administration table 1215, which will be described later.

The deduplication program 1211 determines whether the hash value of a piece of data newly written into the real page 1121 matches with that of the previously written piece of data or not. If the hash values are different from each other, the pieces of data are determined different from each other. If the hash values are identical with each other, the previously written piece of data is read and compared with the newly written piece of data and it is determined whether the pieces of data are matches with each other or not. The determination is made using both the hash value and the content of the data itself because there is a case where the hash values are identical even though the pieces of data are different from each other depending on the specification of the hash function.

When the newly written piece of data and the previously written piece of data are identical with each other, the deduplication program 1211 integrates the redundant piece of data into any one piece of data, and updates the correspondence between the virtual page 1131 and the real page 1121 to a state after the integration. The details thereof will be described later in FIG. 10.

Instead, the deduplication program 1211 may determine whether the piece of data to be newly written is identical with the already written piece of data or not before the piece of data to be newly written is actually written into the real page. If the pieces of data are identical with each other, the real page is not assigned but integrated into the already written piece of data of the real page and the correspondence between the virtual page 1131 and the real page 1121 may be updated to the state after the integration.

Figure 4:
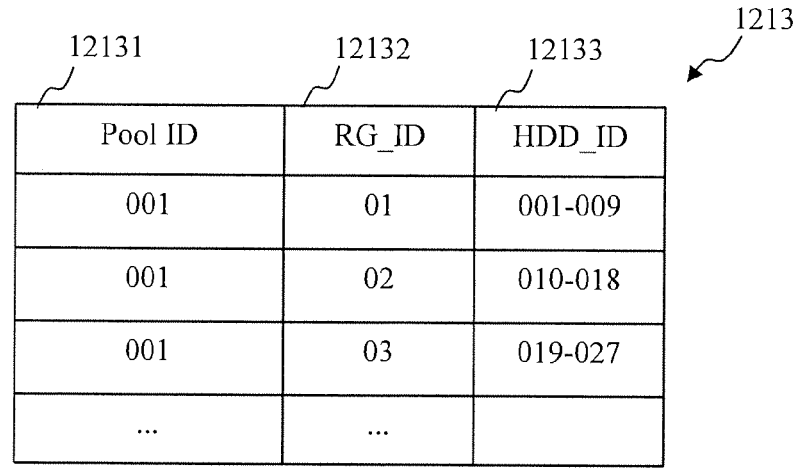
FIG. 4 is a diagram showing a configuration of an apparatus configuration table 1213 and an example of data stored in a main memory 1210.

FIG. 4 is a diagram showing a configuration of the apparatus configuration table 1213 and an example of data stored in the main memory 1210. The apparatus configuration table 1213 is a table that holds a correspondence between the RAID group 1111, which is configured by the disk devices 1101, and the pool 1110. The apparatus configuration table 1213 includes a pool ID field 12131, a RAID group ID field 12132 and a disk device ID field 12133.

The pool ID field 12131 holds the identification number of the pool 1110. The RAID group ID field 12132 holds the identification numbers of the RAID groups 1111 configuring the pool 1110 identified by the value in the pool ID field 12131. The disk device ID field 12133 holds the identification numbers of the disk devices 1101 configuring the RAID group 1111 identified by the value in the RAID group ID field 12132.

In the example of data shown in FIG. 4, it is understood that the pool 1110 identified by the pool ID field 12131=001 includes the RAID groups 1111 identified by the RAID group ID field=01-03, and each RAID group 1111 includes nine disk devices 1101.

Figure 5:
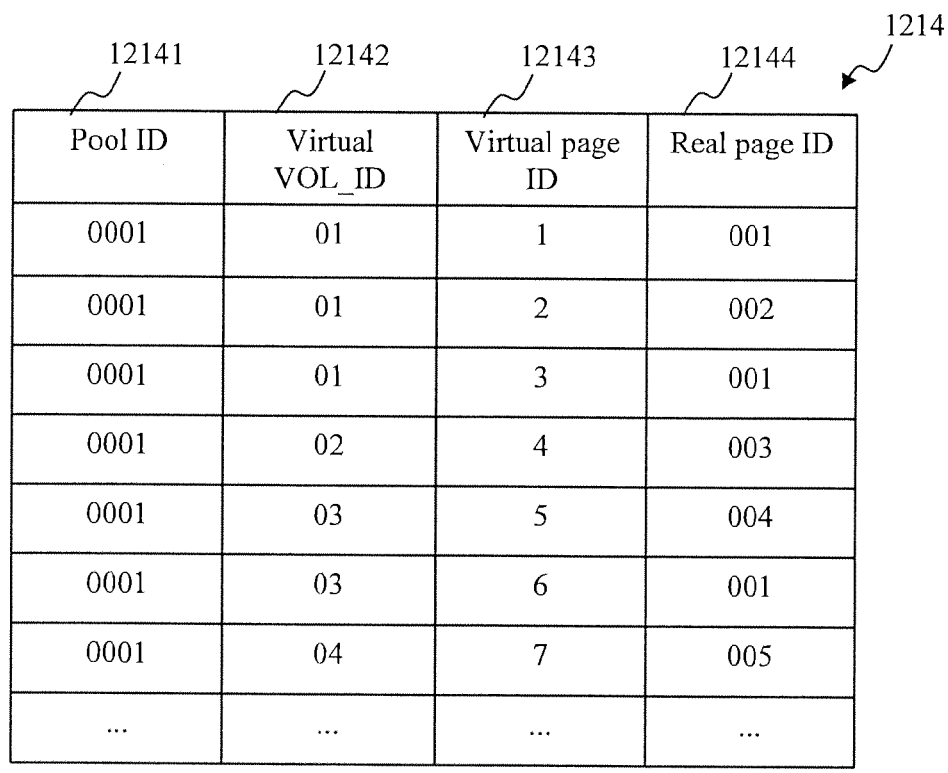
FIG. 5 is a diagram showing a configuration of a virtual page mapping table 1214 and an example of data stored in the main memory 1210.

FIG. 5 is a diagram showing a configuration of the virtual page mapping table 1214 and an example of data stored in the main memory 1210. The virtual page mapping table 1214 is a table that holds the correspondence between the real page 1121 and the virtual page 1131, and includes a pool ID field 12141, a virtual volume ID field 12142, a virtual page ID field 12143 and a real page ID field 12144.

The pool ID field 12141 holds the identification number of the pool 1110. The virtual volume ID field 12142 holds the identification numbers of the virtual volumes 1130 provided by the pool 1110 identified by the value of the pool ID field 12141. The virtual page ID field 12143 holds the identification numbers of the virtual pages 1131 allocated in the virtual volume 1130 identified by the value of the virtual volume ID field 12142. The real page ID field 12144 holds the identification numbers of the real pages 1121 associated with the virtual pages 1131 identified by the values of the virtual page ID 12143.

In the example of data shown in FIG. 5, the real page with the real page ID field 12144=001 is associated with the plurality of virtual pages 1131. In this example of data, it can be understood that the virtual pages "1", "3" and "6", which are recognized as different pages from the host computer 3000, have the entity in a single real page "001". This suggests that the deduplication has been performed on the real page "001".

FIG. 6 is a diagram showing a configuration of the page administration table 1215 and an example of data stored in the main memory 1210. The page administration table 1215 is a table that administrates the attribute of the real page 1121, and includes a real page ID field 12151, a physical address field 12152, an access frequency information field 12153 and a hash value table 12154.

The real page ID field 12151 holds the identification numbers of the real pages 1121. The physical address field 12152 holds the storage destination physical addresses of the real pages 1121 identified by the values of the real page ID field 12151. Here, an example where the physical address field is described by the identifier of the RAID group 1111 and the identifier of the disk device 1101 is described. However, any description format may be employed. The access frequency information field 12153 holds values representing access frequencies to the real page 1121 identified by values of the real page ID field 12151. The hash value table 12154 holds the hash values of the real pages 1121 identified by values of the real page ID field 12151.

FIG. 7 is a diagram showing a configuration of the deduplication threshold table 1216 and an example of data stored in the main memory 1210. The deduplication threshold table 1216 is a table that holds an access frequency threshold for determining whether the deduplication of the real pages 1121 is performed or not. If the access frequency to the real page 1121 equals to this threshold or more, the data deduplication is not performed, because integration of the real pages 1121 by the data deduplication may cause excessive concentration of access to the real page 1121. The details will be described later in FIG. 10.

The deduplication threshold table 1216 includes a pool ID field 12161 and a deduplication threshold field 12162.

The pool ID field 12161 holds the identification number of the pool 1110. The deduplication threshold field 12162 holds an access frequency threshold for data deduplication on the real pages 1121 belonging to the pool 1110 identified by the value of the pool ID field 12161. If the access frequency to the real page 1121 is less than the value of this field, the real page 1121 may be a target of the deduplication. The deduplication threshold field 12162 is thus provided for each pool 1110, because the access performance to the real page 1121 is mainly determined by the configuration of the pool 1110.

Figures 8, 9:
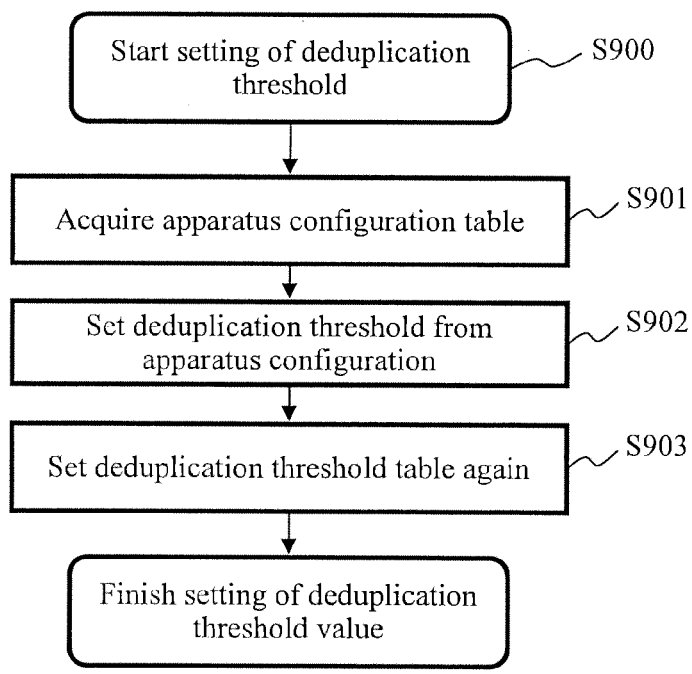
FIG. 8 is a diagram showing a configuration of a deduplication-processed page administration table 1217 and an example of data stored in the main memory 1210.
FIG. 9 is a flowchart of a process that a deduplication program 1211 sets a data value of the deduplication threshold table 1216.

FIG. 8 is a diagram showing a configuration of the deduplication-processed page administration table 1217 and an example of data stored in the main memory 1210. The deduplication-processed page administration table 1217 is a table for grasping the real page 1121 on which the deduplication program 1211 has performed the data deduplication, and includes a real page ID field 12171, a hash value field 12172, a virtual page ID field 12173 and an access frequency information field for each virtual page 12174.

The real page ID field 12171 holds the identification number of the real page 1121. The hash value field 12172 holds the hash value of the real page 1121 identified by the value of the real page ID field 12171. The virtual page ID field 12173 holds the identification number of the virtual page 1131 associated with the real page 1121 identified by the value of the real page ID field 12171. The access frequency information field for each virtual page 12174 holds a value acquired by dividing the access frequency to the real page 1121 identified by the value of the real page ID field 12171 into the access frequencies for respective virtual pages 1131 associated with the real page 1121.

The access frequency for the real page "001" described in FIG. 5 is 200 according to the first row of FIG. 6. However, according to the example of data in FIG. 5, the real page "001" is accessed via the plurality of virtual pages "1", "3" and "6". Therefore, the access frequency for each individual virtual page is less than 200. The access frequencies to the respective virtual pages 1131 amount to 200. The deduplication-processed page administration table 1217 is a table for grasping such access frequencies for the respective virtual pages 1131.

The access frequencies for the respective virtual pages 1131 are thus grasped in order to be used in a case of canceling the data deduplication later and redundantly arranging the data again. The details will be described later in FIG. 11.

The configuration of the storage apparatus 1000 has thus been described. Next, an operation of the storage apparatus 1000 will be described mainly in view of data deduplication.

FIG. 9 is a flowchart of a process that the deduplication program 1211 sets a data value of the deduplication threshold table 1216. Hereinafter, each step of FIG. 9 will be described.

(FIG. 9: Step S900)

The deduplication program 1211 starts this processing flow when, for example, the configuration of the disk of the storage apparatus 1000 is changed. The changing of the disk configuration is events that may influence performance of data input and output, such as for example increase and decrease in the number or replacement of disk devices 1101 configuring the RAID group 1111.

(FIG. 9: Step S900: Supplement)

The disk configuration is changed when, for example, the operator operates the management terminal 2000 and thereby performs an operation that changes the disk devices 1101 configuring the RAID group 1111. The volume virtualization program 1212 causes the deduplication program 1211 to perform this processing flow during performing a process corresponding to this operation.

(FIG. 9: Step S901)

The deduplication program 1211 reads the apparatus configuration table 1213, and acquires the present configurations of the pool 1110, the RAID group 1111 and the disk devices 1101.

(FIG. 9: Step S902)

The deduplication program 1211 sets the value of the deduplication threshold field 12162 on the basis of the configurations of the disk devices 1101 acquired by step S901. A following example can be considered as a setting criterion.

(FIG. 9: Step S902: An Example of the Deduplication Threshold No. 1)

The deduplication program 1211 sets the value of the deduplication threshold field 12162 on the basis of the types and the number of disk devices 1101 configuring the pool 1110. For example, the access performance of the single disk device 1101 is preliminarily stored in an appropriate storage device. A limit performance that can be exerted by the pool 1110 is calculated according to the sum of the performances of the disk devices on the basis of the configuration of the pool and the number of disk devices 1101 configuring the RAID group. A value less than or equal to the limit performance can be set as a value of the deduplication threshold field 12162. Typically, the limit performance is acquired according to the individual access capacities of the disk devices to be used, the number of the disk devices configuring the RAID group and the level of the RAID. An indicator such as IOPS (Input/Output Operations per Second) is used as a performance indicator, which may be provided as performance information of the storage apparatus 1000 and the performance value can be used for setting.

(FIG. 9: Step S902: An Example of the Deduplication Threshold No. 2)

In addition to or instead of the example No. 1, the deduplication program 1211 may set the value of the deduplication threshold field 12162 in consideration of the performances of the main memory 1100, the disk controller 1200 and the like.

(FIG. 9: Step S902: An Example of the Deduplication Threshold No. 3)

The deduplication program 1211 may receive the value of the deduplication threshold field 12162 from the management terminal 2000 or the host computer 3000 and set the value. In this case, the value of the deduplication threshold field 12162 is designated in a manner where an operator of the management terminal 2000 or the host computer 3000 manually sets the value or a manner where an application operating thereon calculates the value and notifies the storage apparatus 1000 thereof.

(FIG. 9: Step S903)

The deduplication program 1211 updates the deduplication threshold table 1216 according to the result of step S902.

Figure 10:
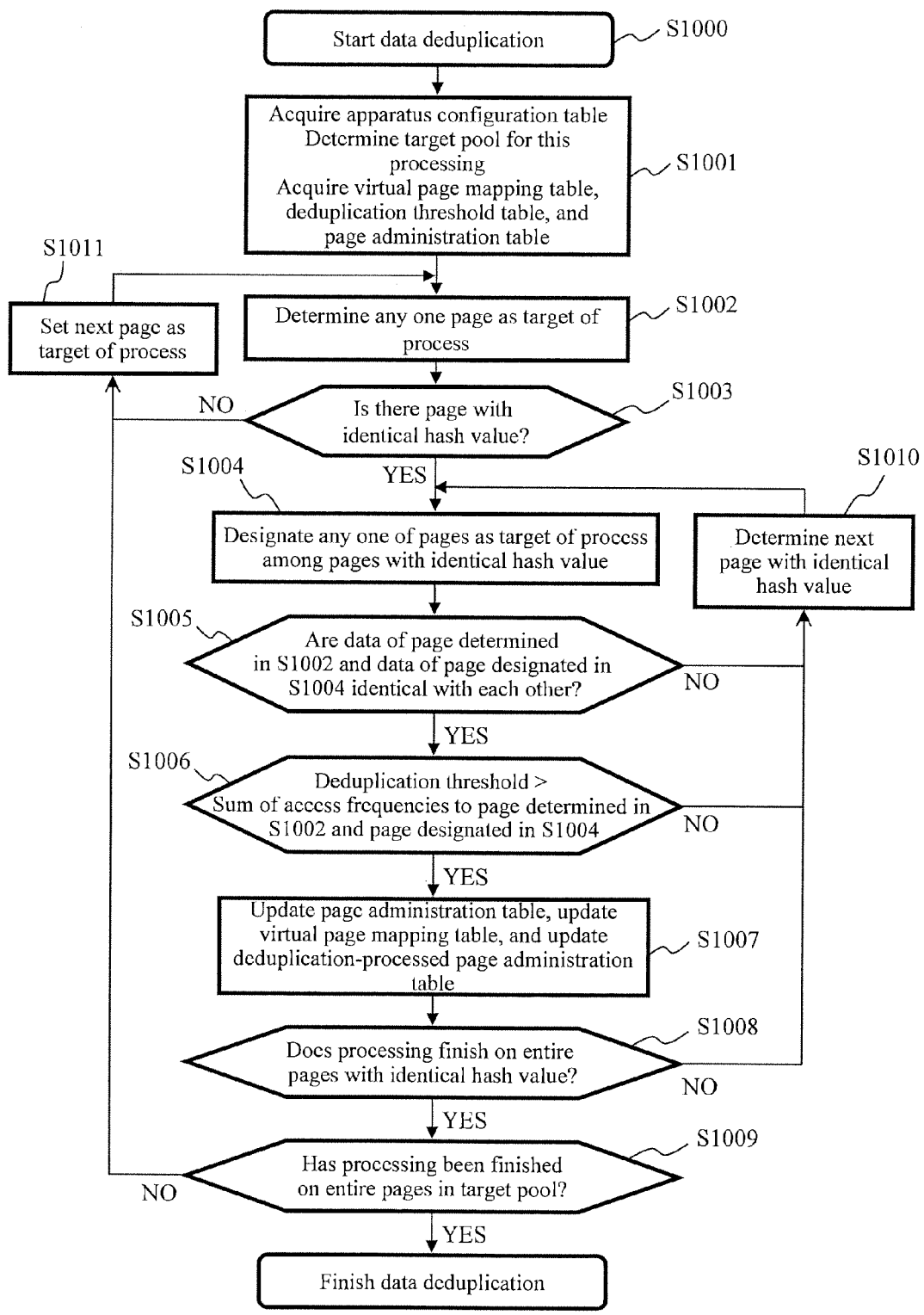
FIG. 10 is a flowchart of a data deduplication process that the deduplication program 1211 cancels redundancy of redundant real pages 1121.

FIG. 10 is a flowchart of a data deduplication process that the deduplication program 1211 cancels redundancy of redundant real pages 1121. Each step of FIG. 10 will hereinafter be described.

(FIG. 10: Step S1000)

The deduplication program 1211 activates this processing flow at, for example, prescribed time intervals. Instead, the activation may be caused in for example a case of the access frequency to the page becomes less than the value of the data deduplication threshold field 12162, a case where the data to be a target of the deduplication reaches or exceeds a prescribed capacity, a case of receiving an indication from the management terminal 2000 or the host computer 3000, or a case of performing another application in the storage apparatus 1000, or in a case of combination of these cases. The trigger of starting this flowchart is not limited thereto.

(FIG. 10: Step S1001)

The deduplication program 1211 reads the apparatus configuration table 1213 to acquire the identification number of the pool, and determines the pool 1110 to be a target on which the deduplication process is performed. Further, the deduplication program 1211 reads the virtual page mapping table 1214 and thereby acquires the correspondence between the virtual page 1131 and the real page 1121. Moreover, the deduplication program 1211 acquires the values of the deduplication threshold field 12162 in each pool 1110 from the deduplication threshold table 1216. Further, the deduplication program 1211 acquires the access frequency information field 12153 and the hash value field 12154 of each real page 1121 from the page administration table 1215.

(FIG. 10: Step S1002)

The deduplication program 1211 determines any one of the real pages 1121 belonging to the pool 1110 that is the target of the deduplication process as a processing target, which will be described later.

(FIG. 10: Step S1003)

The deduplication program 1211 determines whether there is the identical value in the hash value field 12154 of each real page 1121 acquired from the page administration table 1215 or not. If the real page 1121 having the identical hash value exists, the processing proceeds to step S1004; otherwise, the processing skips to step S1011.

(FIG. 10: Step S1004)

The deduplication program 1211 designates any one of the real pages 1121 with the identical hash value as the following processing target. In the case of the example of data shown in FIG. 6, any one of three with the real page ID field 12151=003-005 is designated.

(FIG. 10: Step S1005)

The deduplication program 1211 determines whether the real page 1121 determined as the processing target in step S1002 and the real page 1121 designated as the processing target in step S1004 are the identical with each other or not. In this step, in view of a probability that hash values of the different data become identical with each other, it is reasonable to compare the contents of the actual data. If both pieces of data are identical with each other, the processing proceeds to step S1006; if both pieces of data are different from each other, the processing skips to step S1010.

(FIG. 10: Step S1006)

The deduplication program 1211 compares the value of the deduplication threshold field 12162 acquired in step S1001 with the sum of the access frequency to the real page 1121 determined as the processing target in step S1002 and the access frequency to the real page 1121 designated as the processing target in step S1004. If the value of the deduplication threshold field 12162 is larger, the access frequency at the present time is not so large, it is thereby determined that the data deduplication can be performed and the processing proceeds to step S1007. Otherwise, the processing skips to step S1010.

(FIG. 10: Step S1006: Supplement)

In the examples of data shown in FIGS. 6 and 7, the deduplication threshold field 12162=400, and the sum of the access frequency information field 12153 of the real page ID field 12151=003 and 005 is 250. Accordingly, if the real page IDs "003" and "005" are selected in steps S1002 and S1004, respectively, the processing proceeds to step S1007 after this step.

(FIG. 10: Step S1007)

The deduplication program 1211 integrates the real pages 1121 respectively selected in steps S1002 and S1004 into any one thereof, and thus eliminates data redundancy. The deduplication program 1211 reflects the result of the data deduplication in the page administration table 1215, the virtual page mapping table 1214 and the deduplication-processed page administration table 1217.

(FIG. 10: Step S1007: Supplement No. 1)

The deduplication program 1211 discards any one of the real pages 1121 respectively selected in steps S1002 and S1004, and releases the storage area of the discarded one. The record on the discarded real page 1121 is deleted from the page administration table 1215, the value of the access frequency information field 12153 thereof is added to the value of the access frequency information field 12153 which is not deleted but left. This allows the two real pages 1121 to be integrated into one in view of access frequency management.

(FIG. 10: Step S1007: Supplement No. 2)

The deduplication program 1211 sets the value of the real page ID field 12144 of the real page 1121 to be discarded in this step to the value of real page ID field 12153 of the real page 1121 that is not discarded but left among the records held in the virtual page mapping table 1214. This allows the correspondence between the virtual page 1131 and the real page 1121 to be updated so as to represent the state after the data deduplication.

(FIG. 10: Step S1007: Supplement No. 3)

The deduplication program 1211 registers the real page IDs respectively selected in steps S1002 and S1004 on the deduplication-processed page administration table 1217. In the example of data shown in FIG. 6, the left one of the real pages "003" and "005" is registered. According to the example of data shown in FIG. 5, since the virtual pages "4" and "7" correspond to the real pages "003" and "005", the values thereof are reflected in the virtual page ID field 12173. According to the example of data shown in FIG. 6, since the access frequencies of the real pages "003" and "005" are "50" and "200", respectively, the values thereof are reflected in the access frequency information fields 12174 for each virtual page.

(FIG. 10: Step S1008)

The deduplication program 1211 determines whether the processes in steps S1005 to S1007 have been finished on the entire real pages 1121 having the identical hash value or not. If the processes have totally been finished, the processing proceeds to step S1009. If the processes have not totally been finished yet, the processing skips to step S1010.

(FIG. 10: Step S1009)

The deduplication program 1211 determines whether or not the processes in steps S1003 to S1008 have been finished on the entire real pages 1121 in the pool 1110 determined as the processing target in step S1002. If the processes have totally been finished, this processing flow is completed. If the processes have not been finished yet, the processing skips to step S1011.

(FIG. 10: Step S1010)

The deduplication program 1211 determines the next real page 1121 having the identical hash value, and the processing returns to step S1004. In step S1004, the real page 1121 determined as the next real page 1121 having the identical hash value is designated the any one of pages in step S1004.

(FIG. 10: Step S1011).

The deduplication program 1211 determines the next real page 1121 that is to be the processing target, the processing returns to step S1002. In step S1002, the page set as the processing target in step S1011 is determined as the any one of the pages in S1002 for the processing target.

[Embodiment 1: Conclusion]

As described above, the storage apparatus 1000 according to this Embodiment 1 administrates the access frequencies to the real pages 1121; if the sum of access frequencies of the redundantly allocated real pages 1121 is less than the deduplication threshold, the storage apparatus 1000 cancels the redundant allocation and integrates the real pages 1121 into any one thereof. This allows the access frequency to the real page 1121 to be less than the deduplication threshold even after elimination of the data redundancy, thereby avoiding excessive concentration of access after the data deduplication and access performance degradation.

[Embodiment 2]

In Embodiment 1, the example of operation that eliminates the data redundancy in the volume virtualization environment has been described. In Embodiment 2 of the present invention, an example of operation that once eliminates the data redundancy and subsequently cancels the state and redundantly allocates the data again will be described. Because the configurations of the storage apparatus 1000 and the peripheral devices are analogous to those of Embodiment 1, hereinafter an operation of canceling the deduplication will mainly be described.

Figure 11:
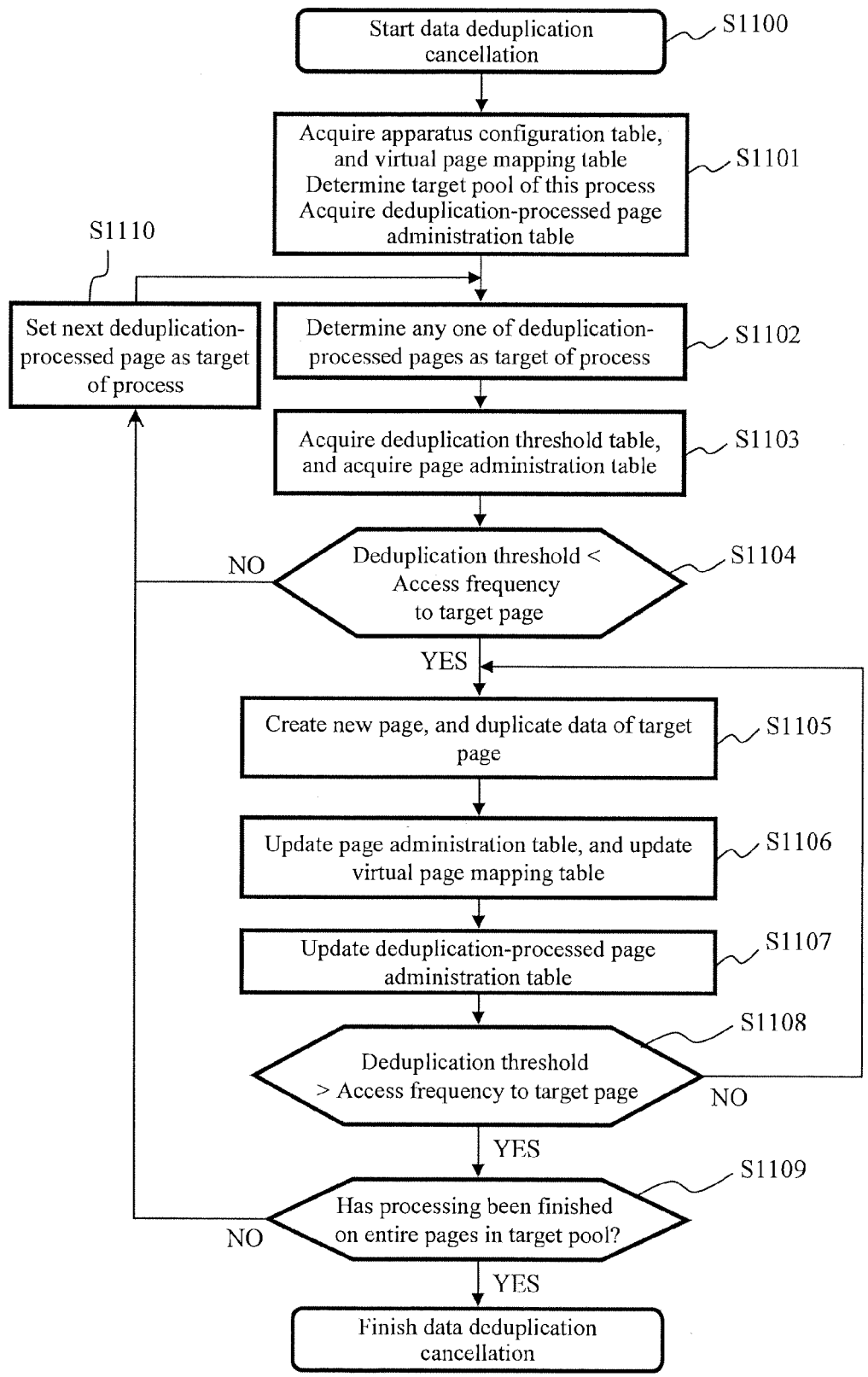
FIG. 11 is a flowchart of a data deduplication cancellation process that cancels the deduplication performed on the real page 1121 by the deduplication program 1211.

FIG. 11 is a flowchart of a data deduplication cancellation process that cancels the deduplication performed on the real page 1121 by the deduplication program 1211. Each step in FIG. 11 will hereinafter be described.

(FIG. 11: Step S1100)

The deduplication program 1211 activates this processing flow according to the criterion analogous to that of the flowchart of FIG. 10. However, there is a possibility of a conflict of processes if this flowchart is activated concurrently with the flowchart in FIG. 10. Accordingly, for example, this flowchart may be activated after the completion of the flowchart of FIG. 10.

(FIG. 11: Step S1101)

The deduplication program 1211 reads the apparatus configuration table 1213, acquires the identification number of the pool, and determines the pool 1110 to be the target of cancellation of the deduplication. Further, the deduplication program 1211 reads the virtual page mapping table 1214, and acquires the correspondence between the virtual page 1131 and the real page 1121. Moreover, the deduplication program 1211 reads the deduplication-processed page administration table 1217, and grasps the real page 1121 on which the deduplication has been performed.

(FIG. 11: Step S1102)

The deduplication program 1211 determines any one of the real pages 1121 registered on the deduplication-processed page administration table 1217 as the following processing target.

(FIG. 11: Step S1103)

The deduplication program 1211 acquires the values of the deduplication threshold field 12162 of each pool 1110 from the deduplication threshold table 1216. Further, the deduplication program 1211 acquires the value of the access frequency information field 12153 of each real page 1121 from the page administration table 1215.

(FIG. 11: Step S1104)

The deduplication program 1211 compares the value of the deduplication threshold field 12162 and the value of the access frequency information field 12153 of the real page 1121 determined as the processing target in step S1102 with each other. If the deduplication threshold is smaller (if the value is identical, either of processes can be selected), it is determined that the access frequency is high at the present time and thereby the data deduplication is necessary to be canceled; the processing proceeds to step S1105. Otherwise, the processing proceeds to step S1110.

(FIG. 11: Step S1105)

The deduplication program 1211 creates a new real page 1121, and duplicates the contents of data of the real page 1121 on which the data deduplication is to be canceled into the real page 1121. In order to avoid access concentration, it is preferable to secure a new real page 1121 on the disk device 1101 other than the disk device 1101 holding the present real page 1121.

(FIG. 11: Step S1106)

The deduplication program 1211 registers a record of the new real page 1121 created in step S1105 on the page administration table 1215. Further, the deduplication program 1211 changes the real page ID field 12144 of the virtual page 1131 on which the data deduplication is to be canceled among the records held by the virtual page mapping table 1214 to the real page ID of the newly created real page 1121.

(FIG. 11: Step S1106: Supplement No. 1)

In this step, it may be determined on which virtual page 1131 the data deduplication is performed, according to for example a criterion of the access frequency to each virtual page 1131. For example, the virtual page 1131 with the highest access frequency may be selected from the deduplication-processed page administration table 1217, and the real page ID field 12144 of the virtual page 1131 may be changed to the real page ID of the newly created real page 1121.

(FIG. 11: Step S1106: Supplement No. 2)

The value of the access frequency information field 12153 of the newly created real page 1121 should be the value of the access frequency information field for each virtual page 12174 of the virtual page 1131 on which the data deduplication is to be cancelled. Further, the value of the access frequency information field 12153 of the original real page 1121 should be a value acquired by decreasing the value of the access frequency information field 12153 of the newly created real page 1121 from the previous value.

(FIG. 11: Step S1107)

The deduplication program 1211 deletes the record of the virtual page 1131 on which the deduplication has been canceled, from the deduplication-processed page administration table 1217.

(FIG. 11: Step S1108)

The deduplication program 1211 compares again the value of the deduplication threshold field 12162 and the value of the access frequency information field 12153 of the real page 1121 determined as the processing target in step S1102. If the deduplication threshold is larger, it is determined that cancellation of the data deduplication suppresses the access frequency to sufficiently low value and the processing proceeds to step S1109. Otherwise, it is determined that the data deduplication is required to be further cancelled, and the processing returns to step S1105 and an analogous process is repeated.

(FIG. 11: Step S1109)

The deduplication program 1211 determines whether the processes in steps S1102 to S1108 on the entire real pages 1121 in the pool 1110 determined as the processing targets in step S1101 have been finished or not. If the processes have totally been finished, this processing flow is finished. If the processes have not totally been finished yet, the processing skips to step S1110.

(FIG. 11: Step S1110)

The deduplication program 1211 determines the next real page 1121 that is to be the processing target, and the processing returns to step S1102. In step S1102, the deduplication-processed page set as the processing target in step S1110 is determined as the any one of the deduplication-processed pages in step S1102 for the processing target.

[Embodiment 2: Conclusion]

As described above, the storage apparatus 1000 according to this Embodiment 2 performs the data deduplication and integrates the real pages 1121, and subsequently, if the access frequency to the real page 1121 becomes more than or equal to the deduplication threshold, the storage apparatus 1000 cancels the deduplication and redundantly allocates the real page 1121 again. This can avoid the access performance from being reduced, even if the access frequency becomes higher after the data deduplication is performed.

Further, the storage apparatus 1000 according to this Embodiment 2 regards the real page 1121 corresponding to the virtual page 1131 with the highest access frequency as a target of cancellation of the deduplication. Accordingly, the deduplication is canceled, thereby allowing an effect of dispersing access to be improved.

[Embodiment 3]

In the above Embodiments 1 and 2, the page administration table 1215 and the deduplication-processed page administration table 1217 administrate the access frequency to the real page 1121. A specific access type as an administration target may be only writing access, only reading access, or the total sum of the writing access and the reading access. Another access type may be a target. These may arbitrarily be combined. Further, the deduplication threshold may be provided for each access type.

The real page 1121 with high access frequency has a possibility that the contents of data are changed. Accordingly, it can be said that such a real page 1121 is unsuitable for the data deduplication. Every time the writing access to the real page 1121 occurs, calculation of a hash value for performing the data deduplication and comparison of contents of data become required, thereby reducing performance of writing.

Accordingly, it is preferable to mainly use writing access frequency as a criterion for determining whether the page is regarded as a target of the data deduplication or not. This allows the real page 1121 with the high writing access frequency unsuitable for the data deduplication to be omitted from the targets of the data deduplication. As a result, access performance degradation owing to the data deduplication can effectively be suppressed.

On the other hand, the reading access does not change the contents of data. Accordingly, the influence thereof concerning the data deduplication is lower than that of the writing access. The influence by the data deduplication on a reading process is only that the access destination held in the virtual page mapping table 1214 is changed. Accordingly, the influence on the reading performance owing to the data deduplication is lower than that on the writing performance.

In the above Embodiments 1 and 2, immediately after newly assigning the real page 1121, access frequency information has not sufficiently been accumulated yet. The real page 1121 may be omitted from the targets on which the data deduplication is performed for a prescribed time period. More specifically, a flag indicating that the real page 1121 is omitted from the targets of the data deduplication may be set to an appropriate storage area in the main memory 1210, or the value of the access frequency information of the real page 1121 may be set to an uncertainty value such as an "unconfirmed" state. Examples of the real page 1121 whose access frequency information has not sufficiently been accumulated yet include the following examples.

(Example with Insufficient Accumulation of Access Frequency Information No. 1)

It is assumed that the access frequency information to the real page 1121 has not sufficiently been accumulated immediately after the host computer 3000 has newly written data.

(Example with Insufficient Accumulation of Access Frequency Information No. 2)

It is assumed that the access frequency information to the real page 1121 has not sufficiently been accumulated immediately after an instruction of assigning the new real page 1121 is received from the management terminal 2000.

(Example with Insufficient Accumulation of Access Frequency Information No. 3)

In Embodiment 2, it is assumed that the access frequency information to the real page 1121 has not sufficiently been accumulated immediately after the data deduplication is canceled and the real page 1121 is newly created.

[Embodiment 4]

In Embodiments 1 to 3, the hash values of the entire real page 1121 are compared with each other, the contents of data of the real pages 1121 with the identical hash value are compared, and subsequently the access frequency and the deduplication threshold are compared with each other. Since this procedure calculates the hash values of the entire real pages 1121, a burden is heavy in view of the processing load.

Thus, in Embodiment 4 of the present invention, the real pages 1121 with the access frequency less than the deduplication threshold are previously extracted and listed as the data deduplication targets, and comparison in hash value and the like are performed on these real pages 1121. The hash value comparison and the like are thus performed on the real page 1121 of the requisite minimum, thereby facilitating reduction in processing load.

Figure 12:
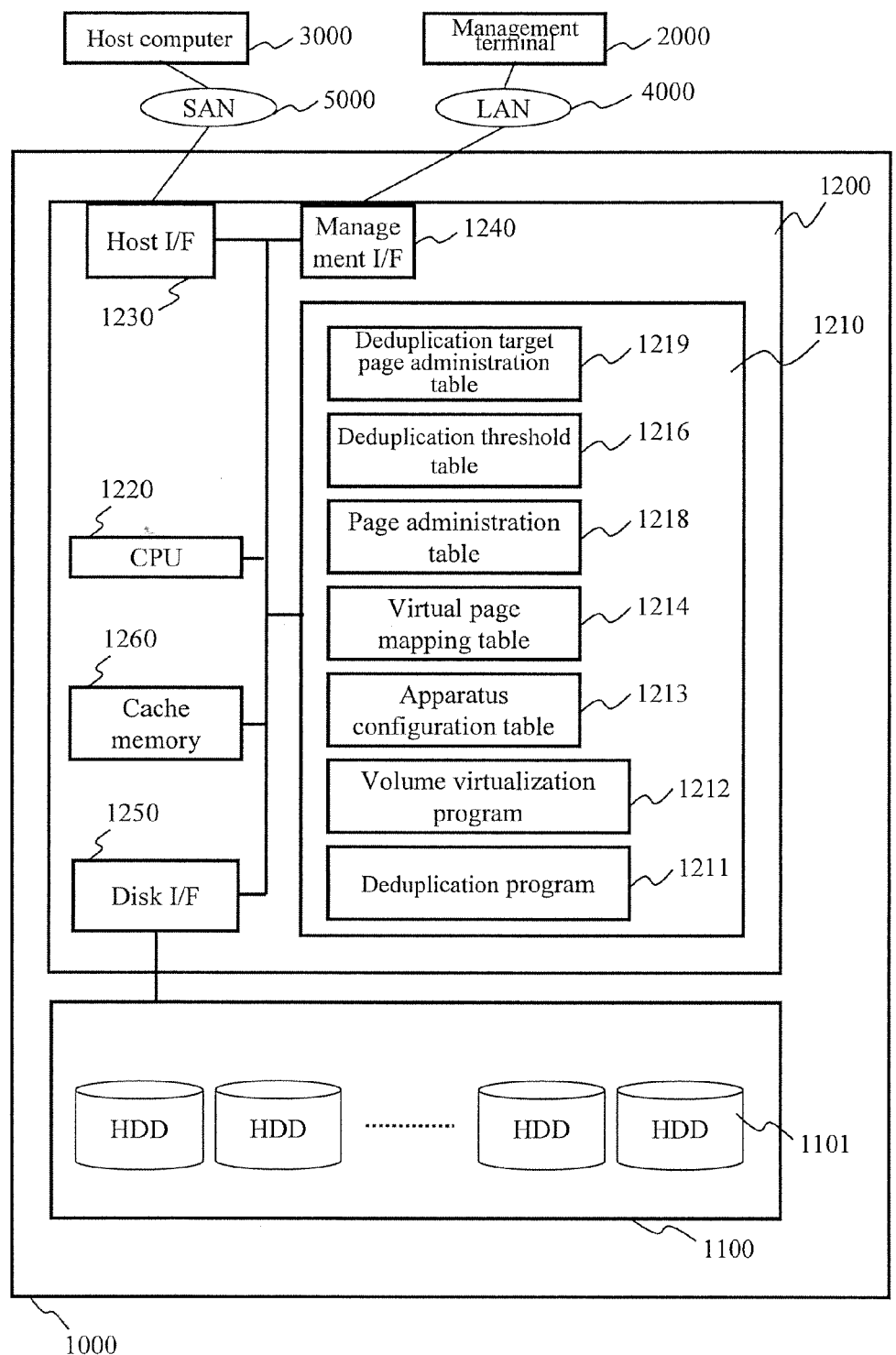
FIG. 12 is a functional block diagram of the storage apparatus 1000 according to Embodiment 4.

FIG. 12 is a functional block diagram of the storage apparatus 1000 according to this Embodiment 4. The storage apparatus 1000 according to this Embodiment 4 includes a page administration table 1218 with a different configuration instead of the page administration table 1215 described in Embodiments 1 to 3. Further, the storage apparatus 1000 includes a deduplication target page administration table 1219 instead of or in addition to the deduplication-processed page administration table 1217. Other configuration is substantially analogous to that of Embodiments 1 to 3. Accordingly, a configuration for previously extracting the data deduplication targets and the example of operation will mainly be described.

FIG. 13 is a diagram showing a configuration of the page administration table 1218 and an example of data. The page administration table 1218 is a table having an object and a configuration substantially analogous to those of the page administration table 1215 illustrated in FIG. 6 of Embodiment 1. The page administration table 1218 includes a real page ID field 12181, a physical address field 12182 and an access frequency information field 12183. In contrast to FIG. 6, the table does not have a field for holding the hash value, because this Embodiment 4 calculates the hash values only for the real pages 1121 to be the data deduplication targets and thereby it is not necessary to hold the hash values of the entire real page 1121.

FIG. 14 is a diagram showing a configuration of the deduplication target page administration table 1219 and an example of data. The deduplication target page administration table 1219 is a table that holds a list of the real pages 1121 that are to be targets on which the data deduplication is performed, and includes a real page ID field 12191, a virtual page ID field 12192, and a hash value field 12193.

The real page ID field 12191 holds the identification number of the real page 1121. The virtual page ID field 12192 holds the identification number of the virtual page 1131 associated with the real page 1121 identified by the real page ID field 12191. The hash value field 12193 holds the hash value of the real page 1121 identified by the value of the real page ID field 12191.

The deduplication program 1211 performs a flowchart, which will be described later in FIG. 15, extracts the real page 1121 that is to be a target on which the data deduplication is performed, and lists the extracted pages in the deduplication target page administration table 1219.

Figure 15:
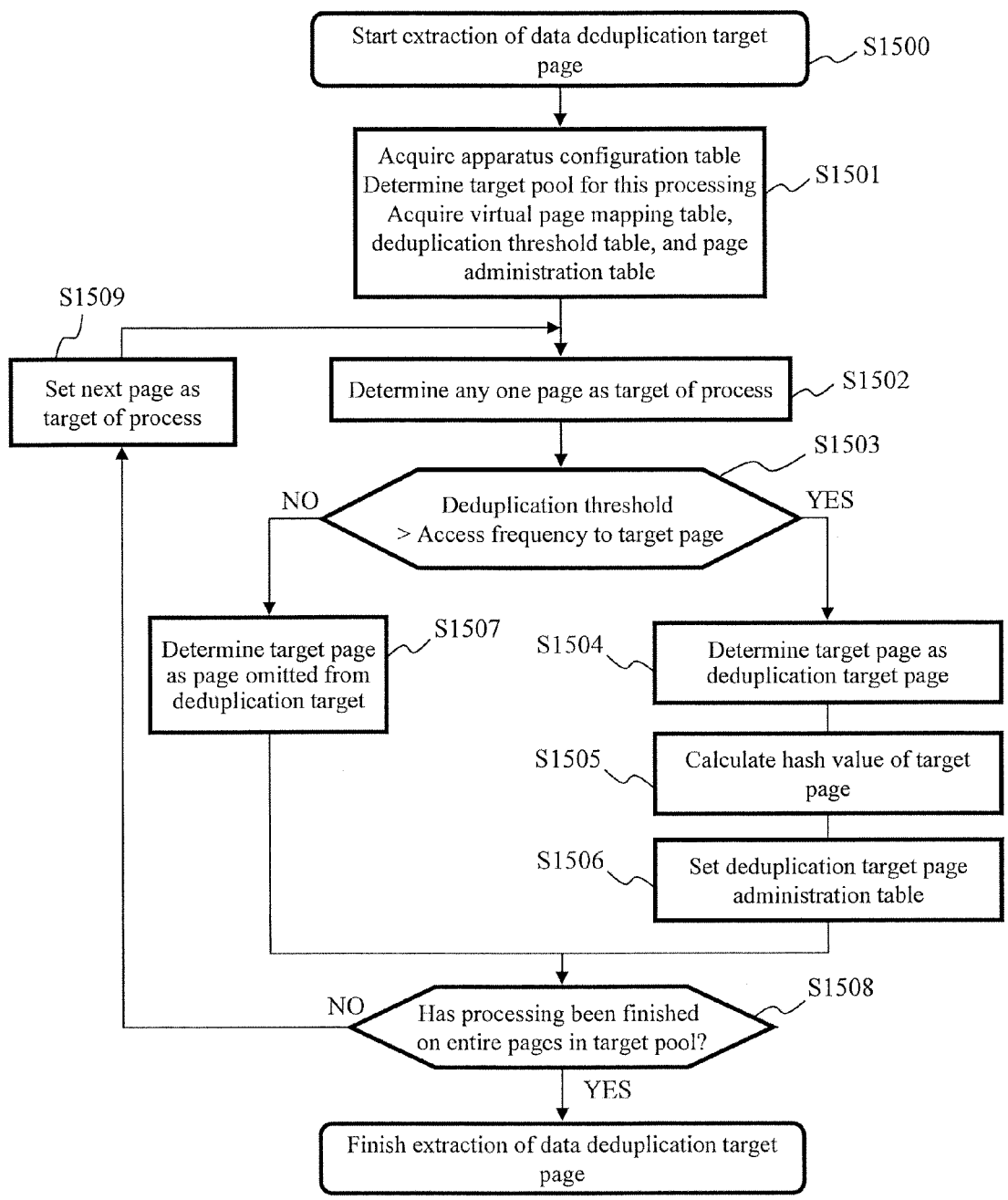
FIG. 15 is a diagram showing procedures of a process that the deduplication program 1211 extracts a real page 1121 which is to be a data deduplication target.

FIG. 15 is a diagram showing procedures of a process that the deduplication program 1211 extracts the real page 1121 which is to be the data deduplication target. Each step in FIG. 15 will hereinafter be described.

(FIG. 15: Step S1500)

The deduplication program 1211 activates this processing flow according to a criterion substantially analogous to the flowchart of FIG. 10. However, there is a possibility of a conflict of processes if this flowchart is activated concurrently with the flowchart in FIG. 10. Accordingly, for example, this flowchart may be activated before the starting of the flowchart of FIG. 10.

(FIG. 15: Steps S1501 to S1502)

These steps are analogous to steps S1001 to S1002 in FIG. 10.

(FIG. 15: Step S1503)

The deduplication program 1211 compares the value of the deduplication threshold field 12162 and the value of the access frequency information field 12183 of the real page 1121 designated in step S1502. If the deduplication threshold is larger, the access frequency at the present time is not so large, it is thereby determined that the real page 1121 is the data deduplication target and the processing proceeds to step S1504. Otherwise, it is determined that the real page 1121 is not the data deduplication target and the processing proceeds to step S1507.

(FIG. 15: Steps S1504 to S1506)

The deduplication program 1211 determines the real page 1121 determined as the processing target in step S1502 as the target of the data deduplication (S1504). The deduplication program 1211 calculates the hash value of the real page 1121 (S1505) and reflects this hash value in the hash value field 12193 in the deduplication target page administration table 1219 (S1506).

(FIG. 15: Step S1507)

The deduplication program 1211 determines that the real page 1121 determined as the processing target in step S1502 is to be omitted from the targets of the data deduplication and the processing proceeds to S1508.

(FIG. 15: Step S1508)

The deduplication program 1211 determines whether the processes in steps S1502 to S1507 on the entire real pages 1121 in the pool 1110 determined as the processing target in step S1501 have been finished or not. If the entire processes have been finished, this processing flow is finished. If the entire processes have not been finished, the processing skips to step S1509.

(FIG. 15: Step S1509)

The deduplication program 1211 determines the next real page 1121 that is to be the processing target, and the processing returns to step S1502.

Figure 16:
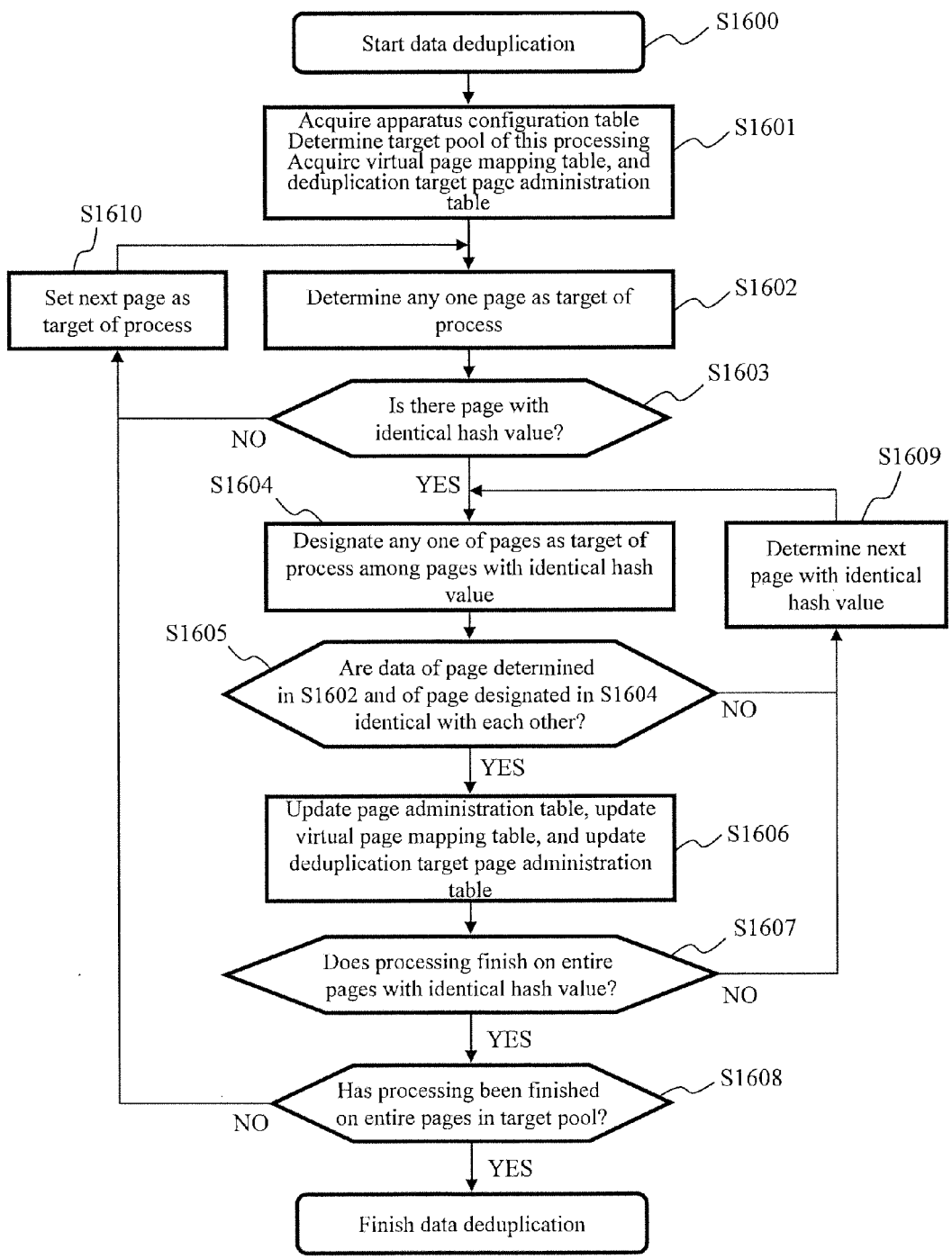
FIG. 16 is a flowchart of a data deduplication process that the deduplication program 1211 resolves redundancy of the redundant real pages 1121 in Embodiment 4.

FIG. 16 is a flowchart of a data deduplication process that the deduplication program 1211 cancels redundancy of the redundant real page 1121 in this Embodiment 4. This process is performed instead of the flowchart of FIG. 10 described in Embodiment 1. Each step of FIG. 16 will hereinafter be described.

(FIG. 16: Step S1600)

The deduplication program 1211 activates this processing flow according to the criterion analogous to that of the flowchart of FIG. 10.

(FIG. 16: Step S1601)

The deduplication program 1211 reads the apparatus configuration table 1213, acquires the identification number of the pool, and determines the pool 1110 that is to be the target on which the deduplication process is performed. Further, the deduplication program 1211 reads the virtual page mapping table 1214, and acquires the correspondence between the virtual page 1131 and the real page 1121. Moreover, the deduplication program 1211 acquires the list of the real pages 1121 that are to be targets on which the data deduplication is performed from the deduplication target page administration table 1219.

(FIG. 16: Step S1602)

The deduplication program 1211 determines any one of the real pages 1121 that are targets on which the data deduplication is performed and acquired in step S1601 as the following processing targets.

(FIG. 16: Step S1603)

The deduplication program 1211 determines whether the hash value field 12193 of each real page 1121 acquired from the deduplication target page administration table 1219 includes the identical values or not. If the real pages 1121 with the identical hash value exist, the processing proceeds to step S1604. Otherwise, the processing skips to step S1610.

(FIG. 16: Step S1604)

This step is analogous to step S1004 in FIG. 10.

(FIG. 16: Step S1605)

The deduplication program 1211 determines whether the real page 1121 determined as the processing target in step S1602 and the real page 1121 designated as the processing target in step S1604 are identical pieces of data or not. This step has an analogous significance to step S1005 in FIG. 10. If both are the identical pieces of data, the processing proceeds to step S1606. If both are different pieces of data, the processing skips to step S1609.

(FIG. 16: Step S1606)

The deduplication program 1211 integrates the real pages 1121 respectively selected in steps S1602 and S1604 into any one thereof, thereby eliminating the data redundancy. The deduplication program 1211 reflects the result of the data deduplication in the page administration table 1218, the virtual page mapping table 1214 and the deduplication target page administration table 1219.

(FIG. 16: Step S1606: Supplement)

The deduplication program 1211 deletes the real page IDs respectively selected in steps S1602 and S1604 from the deduplication target page administration table 1219. The other tables are processed as with step S1007 of Embodiment 1.

(FIG. 16: Steps S1607 to 1610)

These steps are analogous to steps S1008 to S1011 in FIG. 10.

Figure 17:
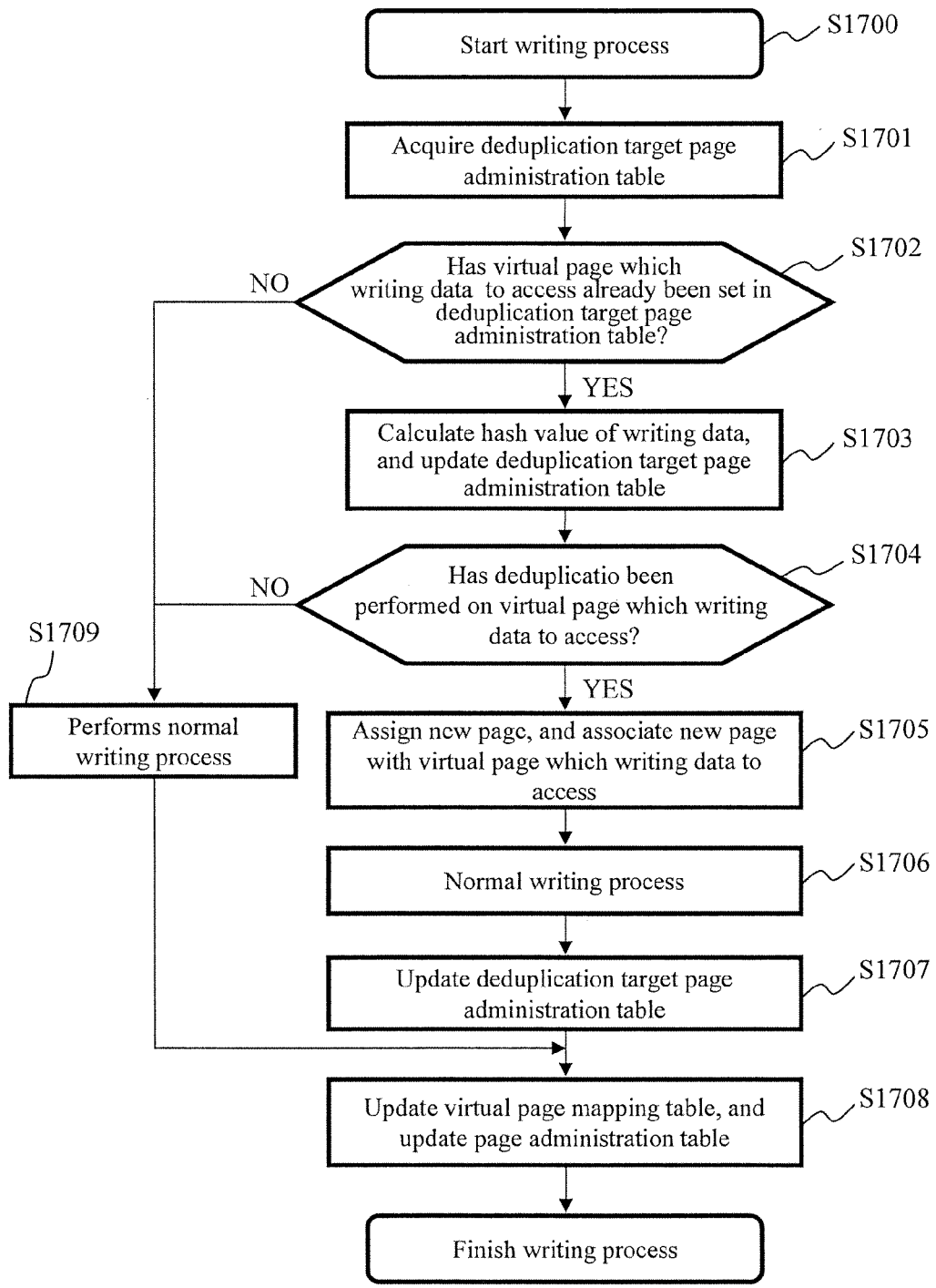
FIG. 17 is a flowchart when the storage apparatus 1000 receives a data writing request of a host computer 3000 in Embodiment 4.

FIG. 17 is a processing flow when the storage apparatus 1000 receives a data writing request of the host computer 3000 in this Embodiment 4. In view of a time lag from the real page 1121 to be the target of the data deduplication process being listed in the deduplication target page administration table 1219 to an actual performance of the data deduplication, this processing flow has a significance that maintains consistency of contents of the deduplication target page administration table 1219 when the writing request is issued in the time lag. Each step in FIG. 17 will hereinafter be described.

In the following description, a case is described that the deduplication process is asynchronously performed after the data has once been stored responsive to a data writing request from the host computer 3000. However, the deduplication process shown in FIG. 16 may be performed between steps S1703 and step S1704. In this case, the real page 1211 that is to be the data writing request by the host computer 3000 is determined as the any one of the pages determined as processing target in step S1602. When the deduplication process is performed, it is not necessary to actually write the writing-requested data, thereby enabling the processing load on the storage apparatus 1000 to be reduced.

When the data writing request is issued from the host computer 3000, the CTL 1200, without determining whether the deduplication has already been performed on the virtual page to be a target of writing or not, and without the hash calculation in S1703, may assign a new page in step S1705 and perform the normal writing process and extract the deduplication target page shown in FIG. 15 in another timing.

(FIG. 17: Step S1700)

When the CTL 1200 receives a data writing request from the host computer 3000, the CTL 1200 activates this processing flow.

(FIG. 17: Step S1701)

The deduplication program 1211 reads the deduplication target page administration table 1219, and grasps the real page 1121 and the virtual page 1131 to be the target on which the data deduplication is to be performed.

(FIG. 17: Step S1702)

The deduplication program 1211 determines whether the virtual page 1131 at the data writing destination is registered on the deduplication target page administration table 1219 or not. If the page is registered, the processing proceeds to step S1703. If the page is not registered, the processing skips to step S1709.

(FIG. 17: Step S1702: Supplement)

The fact that the virtual page 1131 at the data writing destination is registered on the deduplication target page administration table 1219 indicates that a data overwriting request has been issued on the virtual page 1131. Accordingly, it becomes necessary to update the record having already been registered on deduplication target page administration table 1219. Therefore, this processing flow is determined to be performed.

(FIG. 17: Step S1703)

The deduplication program 1211 calculates the hash value of the data on which the writing request has been issued, and reflects the hash value in the hash value field 12193 corresponding to the writing destination virtual page 1131 in the deduplication target page administration table 1219.

(FIG. 17: Step S1704)

The deduplication program 1211 determines whether the data deduplication has been performed on the virtual page 1131 at the data writing destination or not. More specifically, it may be determined according to whether the virtual page 1131 is registered on the deduplication-processed page administration table 1217 or not. If the data deduplication has already been performed, the processing proceeds to step S1705. If the elimination has not been performed, the processing skips to step S1709.

(FIG. 17: Step S1705)

The deduplication program 1211 assigns a new real page 1121 to the virtual page 1131 at the data writing destination.

(FIG. 17: Steps S1706 to S1707)

The deduplication program 1211 writes the data on which the writing request has been received into the newly created real page 1121 via the virtual page 1131 (S1706). The deduplication program 1211 reflects the value of the real page ID of the real page 1121 in which the data has newly been written, in the real page ID field 12191.

(FIG. 17: Step S1708)

The deduplication program 1211 reflects the correspondence with the new real page 1121 in the virtual page mapping table 1214. Further, the deduplication program 1211 reflects the record of the new real page 1121 in the page administration table 1218.

(FIG. 17: Step S1709)

The deduplication program 1211 writes the data on which the writing request has been received into the real page 1121 via the corresponding virtual pate 1131. After this step, the processing proceeds to step S1708.

[Embodiment 4: Conclusion]

As described above, the storage apparatus 1000 according to this Embodiment 4 compares the access frequency and the deduplication threshold with each other and preliminarily lists the real page 1121 that is the target on which the data deduplication is to be performed on the deduplication target page administration table 1219, and performs comparison in hash value and the like only on the real pages 1121 registered on the deduplication target page administration table 1219. This allows the processing load concerning the hash value processing and the like to be reduced.

In this Embodiment 4, description on the deduplication-processed page administration table 1217 is omitted. However, also in this Embodiment 4, the real pages 1121 on which the data deduplication has been performed may be listed using the deduplication-processed page administration table 1217 and the deduplication may be canceled later, as with Embodiments 1 to 3.

[Embodiment 5]

In Embodiment 4, the technique has been described that preliminarily lists the real page 1121 that is a target on which the data deduplication is to be performed on the deduplication target page administration table 1219 and performs the data deduplication only on this real page 1121. In Embodiment 5 of the present invention, a configuration and an example of operation will be described that integrate the real pages 1121 to be the targets on which the data deduplication is performed into any one of the RAID groups 1111 and performs the data deduplication on this RAID group 1111, as another technique.

Hereinafter a configuration that integrates the real pages 1121 to be the data deduplication targets into any one of the RAID group 1111 will mainly be described. The other configuration is analogous to that of Embodiments 1 to 4. The configuration and technique according to this Embodiment 5 may be applied to any one of Embodiments 1 to 4.

FIG. 18 is a diagram showing a configuration of the apparatus configuration table 1213 and an example of data in this Embodiment 5. In this Embodiment 5, the apparatus configuration table 1213 includes a new data deduplication target field 12134 in addition to the configuration illustrated in FIG. 4 in Embodiment 1.

The data deduplication target field 12134 holds a flag value indicating whether the data deduplication process illustrated in FIG. 10 or 16 is performed or not on the RAID group 1111 identified by the value of the RAID group ID field 12132. The value in this field may be set according to any one of the following manners.

(Example of Setting Data Deduplication Target Field 12134 No. 1)

An operator of the management terminal 2000 instructs which RAID group 1111 to be specified as the target of the data deduplication to the storage apparatus 1000. The volume virtualization program 1212 or the deduplication program 1211 reflects the indication in this field.

(Example of Setting Data Deduplication Target Field 12134 No. 2)

The volume virtualization program 1212 or the deduplication program 1211 omits the RAID group 1111 with a high access frequency from the targets of the data deduplication, and specifies the RAID group 1111 with a low access frequency as the target of the data deduplication. This is for avoiding influence on the data with a high access frequency, because the data deduplication process causes a heavy load when the hash value is calculated. With respect to the access performance of each RAID groups 1111, for example, the access performances of the respective disk devices 1101 are preliminarily stored in the appropriate storage device, and a limit performance based on the disk performances may be determined according to the sum of the disk device performances based on the configurations. In general, the limit performance is acquired according to the individual access performances of the respective disk devices to be used, the number of disk devices configuring the RAID group, and a RAID level. An indicator, such as the TOPS (Input/Output Operations per Second), may be used as a performance indicator, and provided as performance information of the storage apparatus 1000. The performance value may be used for setting.

(Example of Setting Data Deduplication Target Field 12134 No. 3)

The volume virtualization program 1212 or the deduplication program 1211 refers to the access frequency information of the real page and omits the real page 1121 with a high access frequency from the targets of the data deduplication, while specifying the real page 1121 with a low access frequency as the target of the data deduplication. As a result, the RAID group 1111 having a storage capacity sufficient to store the real page 1121 that is to be the target of the data deduplication is specified as the target of the data deduplication.

Figure 19:
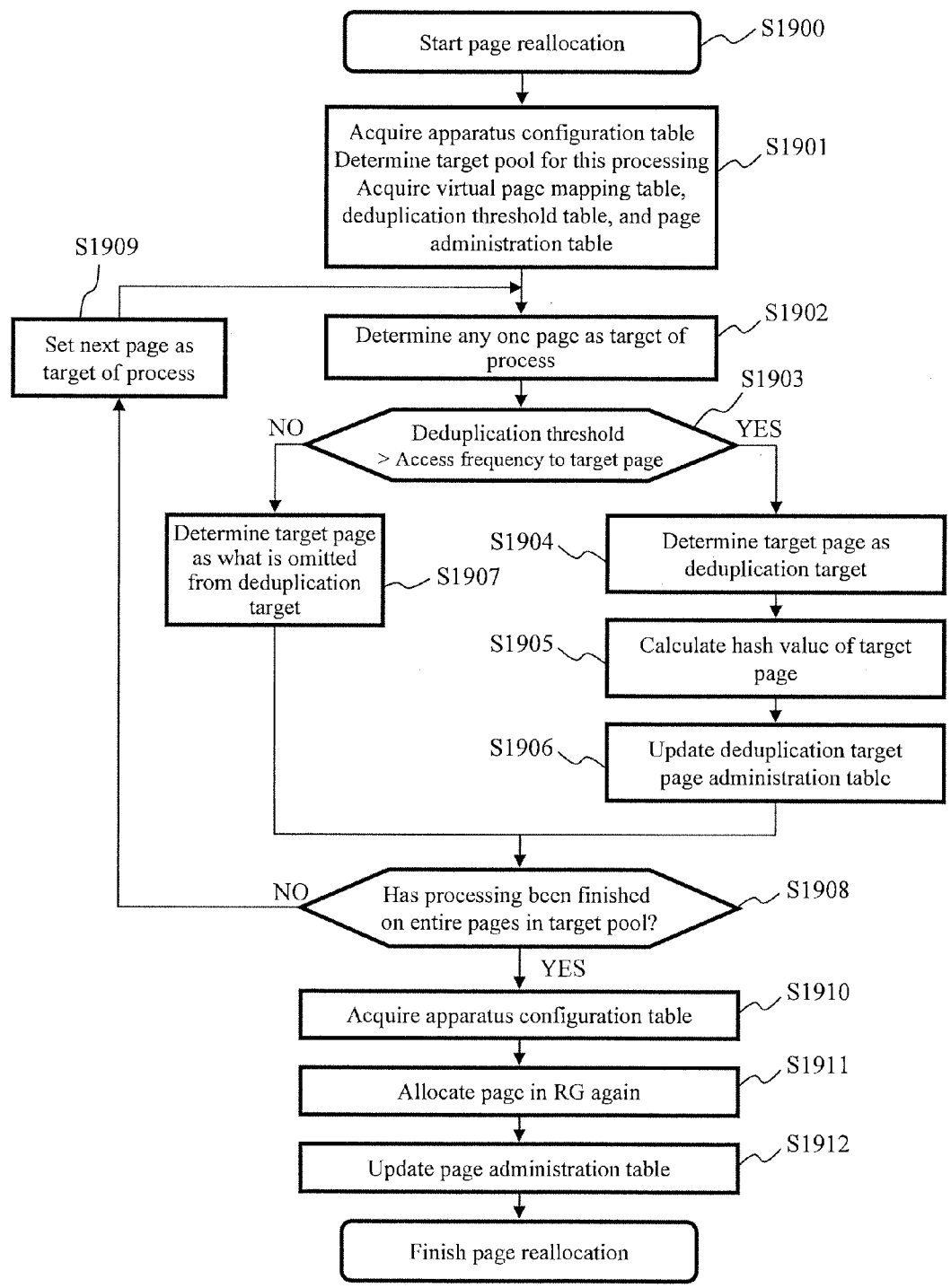
FIG. 19 is a flowchart showing procedures of a process of moving a real page 1121, which is to be a data deduplication target, to a RAID group 1111, which is to be a data deduplication target.

FIG. 19 is a flowchart showing procedures of a process where the deduplication program 1211 moves the real page 1121 that is to be a data deduplication target to the RAID group 1111 that is to be a data deduplication target. Each step of FIG. 19 will hereinafter be described.

(FIG. 19: Step S1900)

The deduplication program 1211 activates this processing flow according to a criterion analogous to that of the flowchart in FIG. 10. However, there is a possibility of a conflict of processes if this flowchart is activated concurrently with the flowchart in FIG. 10. Accordingly, for example, this flowchart may be activated before or after the activation of the flowchart of FIG. 10 or in a period until the activation of the flowchart of FIG. 10.

(FIG. 19: Steps S1901 to S1909)

These steps are analogous to steps S1501 to S1509 in FIG. 15. However, subsequent to the step S1908, this processing flow is not finished but the processing proceeds to step S1910.

(FIG. 19: Step S1910)

The deduplication program 1211 reads the apparatus configuration table 1213, and identifies the RAID group 1111 on which the data deduplication is to be performed and the RAID group 1111 on which the data deduplication is not to be performed.

(FIG. 19: Step S1911)

The deduplication program 1211 moves the real page 1121 specified as the target of the data deduplication in step S1904 to the RAID group 1111 on which the data deduplication is to be performed. Further, the deduplication program 1211 moves the real page 1121 omitted from the target of the data deduplication in step S1907 to the RAID group 1111 on which the data deduplication is not to be performed.

(FIG. 19: Step S1912)

The deduplication program 1211 reflects the result in step S1911 in the page administration table 1215 (or 1218).

The deduplication program 1211 performs the flowchart of FIG. 10 (or FIG. 16) after finishing this flowchart, and performs the data deduplication. After finishing this flowchart, until performing the data deduplication, when the data writing request is received, the process analogous to that in FIG. 17 may be performed and the result of writing may be reflected in each table.

[Embodiment 5: Conclusion]

As described above, the storage apparatus 1000 according to this Embodiment 5 classifies the RAID groups 1111 according to criteria described in the above (Example of setting No. 1) to (Example of setting No. 3), and preliminarily moves the real page 1121 on which the data deduplication is to be performed and the other real page 1121 to the respective RAID groups 1110. This allows the processing load according to the hash value processing and the like to be reduced as with Embodiment 4.

[Embodiment 6]

Each configuration, function and processor described in Embodiments 1 to 5 may be realized as hardware by designing all or a part thereof as for example integrated circuits, and realized as software by performing programs realizing the respective functions by a processor.

Reference Signs List

1000 storage apparatus
1100 disk device group
1101 disk device
1110 pool
1111 RAID group
1120 real volume
1121 real page
1130 virtual volume
1131 virtual page
1200 disk controller
1210 main memory
1211 deduplication program
1212 volume virtualization program
1213 apparatus configuration table
12131 pool ID field
12132 RAID group ID field
12133 disk device ID field
12134 data deduplication target field
1214 virtual page mapping table
12141 pool ID field
12142 virtual volume ID field
12143 virtual page ID field
12144 real page ID
1215 page administration table
12151 real page ID field
12152 physical address field
12153 access frequency information field
12154 hash value field
1216 deduplication threshold table
12161 pool ID field
12162 deduplication threshold field
1217 deduplication-processed page administration table
12171 real page ID field
12172 hash value field
12173 virtual page ID field
12174 access frequency information field for each virtual page
1218 page administration table
12181 real page ID field
12182 physical address field
12183 access frequency information field
1219 deduplication target page administration table
12191 real page ID field
12192 virtual page ID field
12193 hash value field
1220 CPU
1230 host I/F
1240 management I/F
1250 disk I/F
1260 cache memory
2000 management terminal
3000 host computer
4000 LAN
5000 SAN

The invention claimed is:

1. A storage apparatus, comprising:
a storage device storing data;
a controller configured to control data reading and writing of the storage device;
a volume virtualization unit configured to virtualize the storage device and provide a higher-level device with the virtualized storage device as a virtual storage capacity;
an administration table administrating which location in the storage device a piece of data in the virtual storage capacity is stored;
an access frequency administration table administrating an access frequency to the piece of data stored in the storage device: and
a deduplication unit configured to perform deduplication by integrating pieces of data redundantly allocated in the storage device,
wherein the deduplication unit is configured to acquire access frequencies to respective pieces of data redundantly allocated in the storage device from the access frequency administration table, obtain a sum thereof, and, if the sum is less than a prescribed threshold, perform the deduplication by integrating pieces of data into any one thereof and
update the storage location information of the piece of data in the storage device before the deduplication that is held by the administration table to storage location information of the piece of data in the storage device after the deduplication, wherein the deduplication unit, if the access frequency to the piece of data equals to or is more than the prescribed threshold after pieces of data are integrated in the deduplication, is configured to duplicate the piece of data subjected to the deduplication and pieces of data are redundantly allocated again, and update the storage location information of the piece of data in the storage device alter the deduplication that is held by the administration table to storage location information in the storage device after the duplication.

2. The storage apparatus according to claim 1, wherein the deduplication unit is configured to acquire an access performance sum of at least one of the storage devices provided as the virtual storage capacity by the volume virtualization unit, and set the prescribed threshold to a value less than or equal to the access performance sum.

3. The storage apparatus according to claim 1, further comprising a deduplication administration table that holds identification information of the piece of data subjected to the deduplication, wherein the deduplication unit is configured to identify the piece of data to be a target of the duplication according to the identification information held by the deduplication administration table.

4. The storage apparatus according to claim 3, wherein the deduplication administration table holds the value of the access frequency held by the access frequency administration table in a manner divided with respect to each virtual storage capacity, and the deduplication unit, when duplicating the piece of data subjected to the deduplication and redundantly allocating the duplicated piece of data again, is configured to regard, as the target of duplication, the piece of data corresponding to the highest access frequency among access frequencies held by the deduplication administration table in a manner divided with respect to each virtual storage capacity.

5. The storage apparatus according to claim 3, wherein the deduplication administration table holds the access frequency to the piece of data stored in the storage device in a manner divided with respect to each virtual storage capacity, and the deduplication unit, when duplicating the piece of data subjected to the deduplication and redundantly allocating the duplicated piece of data again, is configured to set the value of the access frequency corresponding to the piece of data before the duplication that is held by the deduplication administration table, as an access frequency corresponding to the related piece of data of the access frequency administration table.

6. The storage apparatus according to claim 3, wherein the deduplication administration table holds the access frequency to the piece of data stored in the storage device in a manner divided with respect to each virtual storage capacity, and the deduplication unit, when duplicating the piece of data subjected to the deduplication and redundantly allocating the duplicated piece of data again, is configured to set the value of the access frequency corresponding to the piece of data in the access frequency administration table to an unconfirmed state.

7. The storage apparatus according to claim 1, wherein the access frequency administration table administrates a writing access frequency to the piece of data stored in the storage device as the access frequency.

8. The storage apparatus according to claim 1, wherein the access frequency administration table administrates a sum of a writing access frequency and a reading access frequency to the piece of data stored in the storage device as the access frequency.

9. The storage apparatus according to claim 1, further comprising a deduplication target data administration table that holds a list of the piece of data to be a target on which the deduplication is performed, wherein the deduplication unit is configured to preliminarily extract the piece of data to be the target of the deduplication according to the access frequency administrated by the access frequency administration table before the deduplication is performed, and store the list of the extracted piece of data in the deduplication target data administration table, determine, only for the piece of data held by the deduplication target data administration table, whether the piece of data is redundantly allocated in multiple of the storage device or not, and, if the piece of data is redundant, the deduplication is performed on that piece of data.

10. The storage apparatus according to claim 9, wherein the deduplication unit is configured to calculate a hash value of the piece of data held by the deduplication target data administration table and store the hash value in the deduplication target data administration table, and, if the hash values of the pieces of data allocated in the storage devices are identical with each other, determine that the pieces of data are redundantly allocated in the storage apparatuses.

11. The storage apparatus according to claim 10, wherein the controller is configured to determine whether or not writing to the piece of data listed on the deduplication target data administration table is performed before writing the piece of data in the storage device, and the deduplication unit is configured to, if the controller determines that the writing to the piece of data listed on the deduplication target data administration table is performed, calculate the hash value again and stores the hash value in the deduplication target data administration table.

12. The storage apparatus according to claim 1, wherein the volume virtualization unit is configured to divide the storage devices into a high access frequency group having a high access frequency and a low access frequency group having a low access frequency, and the deduplication unit is configured to acquire the access frequency to the group from the access frequency administration table, perform the deduplication on the pieces of data stored in the storage devices belonging to the low access frequency group, and not perform the deduplication on the pieces of data stored in the storage devices belonging to the high access frequency group.

13. The storage apparatus according to claim 1,
wherein the volume virtualization unit is configured to
divide the storage devices into a group omitted from deduplication targets that has a sufficient capacity for storing the pieces of data having the high access frequency that is not to be a target on which the deduplication unit performs the deduplication, and a deduplication target group for storing the pieces of data having the low access frequency, the deduplication unit is configured to acquire the access frequency to the piece of data from the access frequency administration table, and, if the value is less than the prescribed threshold, move the piece of data to the storage device belonging to the deduplication target group, and, if the value is at least the prescribed threshold, move the piece of data to the storage device belonging to the group omitted from deduplication targets, perform the deduplication on the pieces of data stored in the storage devices belonging to the deduplication target group, and not perform the deduplication on the pieces of data stored in the storage devices belonging to the group omitted from deduplication targets.

* * * * *